United States Patent
Joye et al.

(10) Patent No.: US 10,263,470 B2
(45) Date of Patent: Apr. 16, 2019

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Andriess Van Wageningen, Wijlre (NL); Wilhelmus Gerardus Maria Ettes, Friesland (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 219 days.

(21) Appl. No.: 14/905,362

(22) PCT Filed: Jul. 1, 2014

(86) PCT No.: PCT/EP2014/063963
§ 371 (c)(1),
(2) Date: Jan. 15, 2016

(87) PCT Pub. No.: WO2015/007518
PCT Pub. Date: Jan. 22, 2015

(65) Prior Publication Data
US 2016/0156232 A1    Jun. 2, 2016

(51) Int. Cl.
*H02J 50/12* (2016.01)
*H02J 50/80* (2016.01)
(Continued)

(52) U.S. Cl.
CPC ............. *H02J 50/12* (2016.02); *H02J 5/005* (2013.01); *H02J 7/025* (2013.01); *H02J 50/10* (2016.02);
(Continued)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS

| 8,680,811 B2 | 3/2014 | Mochida |
| 9,287,716 B2 | 3/2016 | Toshimitsu |

(Continued)

FOREIGN PATENT DOCUMENTS

| DE | 102004039648 A1 | 3/2006 |
| DE | 102004039650 A1 | 3/2006 |

(Continued)

OTHER PUBLICATIONS

ISO/IEC_18092: Information technology—Telecommunications and information exchange between systems—Near Field Communication—Interface and Protocol (NFCIP-1), Second edition, Mar. 15, 2013.
(Continued)

*Primary Examiner* — Levi Gannon
(74) *Attorney, Agent, or Firm* — Larry Liberchuk

(57) ABSTRACT

A wireless power transfer system includes a power transmitter (101) arranged to provide a power transfer to a power receiver (105) via a wireless inductive power transfer signal where the power transfer signal is provided in a power time interval of a repeating power transfer signal time frame. The time frame furthermore comprises a reduced power time interval. An apparatus (typically being the power receiver (105) or the power transmitter (101)) comprises a short range communication unit (305, 405) arranged to communicate data messages with a second entity (which is the complementary unit, i.e. either the power transmitter (101)) or the power receiver (105)) using short range communication. The short range communication has a range not exceeding 20 cm. The apparatus further comprises a synchronization unit (309, 409) arranged to synchronize the short range communication to the power transfer signal time frame such that short range communication is restricted to the reduced power time intervals. The communication may specifically be NFC communication.

21 Claims, 15 Drawing Sheets

(51) Int. Cl.
*H02J 7/02* (2016.01)
*H02J 50/40* (2016.01)
*H02J 50/90* (2016.01)
*H02J 5/00* (2016.01)
*H04B 5/00* (2006.01)
*H02J 50/10* (2016.01)
*H01F 38/14* (2006.01)

(52) U.S. Cl.
CPC ............ *H02J 50/40* (2016.02); *H02J 50/80* (2016.02); *H02J 50/90* (2016.02); *H04B 5/0037* (2013.01); *H04B 5/0075* (2013.01); *H01F 38/14* (2013.01); *H04B 5/0031* (2013.01)

(58) Field of Classification Search
CPC ..... H02J 50/80; H04B 5/0031; H04B 5/0037; H04B 5/0075
USPC .......................................................... 307/104
See application file for complete search history.

(56) References Cited

U.S. PATENT DOCUMENTS

| | | |
|---|---|---|
| 9,444,521 B2 | 9/2016 | Hamada |
| 2008/0296978 A1* | 12/2008 | Finkenzeller ........ G06K 7/0008 307/104 |
| 2009/0227282 A1 | 9/2009 | Miyabayashi |
| 2010/0151808 A1* | 6/2010 | Toncich ................ H02J 7/025 455/226.3 |
| 2010/0248622 A1 | 9/2010 | Lyell Kirby |
| 2011/0184888 A1* | 7/2011 | Lee ........................ G06Q 50/06 705/412 |
| 2011/0204711 A1 | 8/2011 | Norconk |
| 2012/0063505 A1 | 3/2012 | Okamura |
| 2012/0149303 A1 | 6/2012 | Moes |
| 2012/0153894 A1* | 6/2012 | Widmer ............... H04B 5/0037 320/108 |
| 2012/0314745 A1* | 12/2012 | Tsai ..................... H04B 5/0031 375/224 |
| 2013/0093387 A1 | 4/2013 | Vassilieff |
| 2015/0042287 A1* | 2/2015 | Liu ......................... H02J 50/90 320/134 |
| 2015/0341085 A1 | 11/2015 | Ettes |
| 2016/0036497 A1* | 2/2016 | Tavakoli Shiraji .. H04B 5/0037 455/41.1 |

FOREIGN PATENT DOCUMENTS

| | | |
|---|---|---|
| WO | WO2012049582 A1 | 4/2012 |
| WO | WO2012099965 A2 | 7/2012 |
| WO | WO2012109137 A2 | 8/2012 |
| WO | WO2013046104 A1 | 4/2013 |

OTHER PUBLICATIONS

NFC Activity Specification, Technical Specification, Version 1.0, NFC Forum, Nov. 18, 2010.
NFC Digital Protocol, Technical Specification, Version 1.0, NFC Forum, Nov. 17, 2010.
NFC Analog Specification, Technical Specification, Version 1.0, NFC Forum, Jul. 11, 2012.
Cordless Kitchen Appliances—A Powerful New Kitchen Concept, Wireless Power Consortium, White Paper, Apr. 2013.

* cited by examiner

WIRELESS INDUCTIVE POWER TRANSFER

FIELD OF THE INVENTION

The invention relates to inductive power transfer and in particular, but not exclusively, to an inductive power transfer system in accordance with the Qi wireless power transfer standard.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power transfer signal. The resulting changes in the electrical characteristics (e.g. variations in the current draw) can be detected and decoded (demodulated) by the power transmitter.

However, a limitation of the Qi system is that it does not support communication from the power transmitter to the power receiver (at least in the low power Qi specification). Furthermore, load modulation such as developed for Qi may be suboptimal in some applications.

Indeed, communication between receiver and transmitter in a power transfer system such as the Qi system is faced with multiple challenges and difficulties. In particular, there is typically a conflict between the requirements and characteristics of the power transfer signal and the desires for the communication. Typically, the system requires close interaction between the power transfer and communication functions. For example, the system is designed based on the concept of only one signal being inductively coupled between the transmitter and the power receiver, namely the power transfer signal itself. However, using the power transfer signal itself for not only performing a power transfer but also for carrying information results in difficulties.

For example, in many scenarios, the power transfer signal amplitude may be dynamically and periodically varying resulting in the power transfer signal not always being suitable for modulation. Indeed, if the power transfer signal amplitude temporarily is reduced to substantially zero, there is no signal to be modulated—whether for directly e.g. amplitude or frequency modulation of the power transfer signal to provide communication from power transmitter to power receiver or for load modulation of the power transfer signal to provide communication from power receiver to power transmitter.

As another example, using a load modulation approach wherein the power receiver communicates data by load modulation (such as in the Qi system) requires that the normal load is relatively constant. However, this cannot be guaranteed in many applications.

E.g., if wireless power transfer is to be used to power a motor driven appliance (such as e.g. a blender), the amplitude of this current is strongly related to the load of the motor. If the motor load is changing, the motor current is changing as well. This results in the amplitude of the inverter current also changing with the load. This load variation will interfere with the load modulation, resulting in degraded communication. Indeed, in practice it is typically very difficult to detect load modulation for loads that include a motor as part of the load.

In order to address such issues, it has been proposed to use a completely separate communication technology for providing communication between the power transmitter and power receiver. However, whereas such an approach may solve some problems, it typically introduces other disadvantages.

For example, it typically introduces a risk that a communication may be established which is not between the two parties involved in the power transfer. This will typically lead to faulty and potentially less safe operation. E.g., the use of separate communication channels could result in interference between the operations of different power transfer operations which could result in an undesirable situation with excessive power levels. For example, the control operations may interfere with each other, e.g. by the control data from the power receiver of one power transfer operation being used to control the power transfer of another nearby power receiver. The separation between communication and power transfer signals may result in less robust and less fail safe operation.

Hence, an improved power transfer system would be advantageous and in particular a system allowing improved communication support, increased reliability, increased flexibility, facilitated implementation, reduced sensitivity to load variations, improved safety and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for a wireless power transfer system including a power transmitter arranged to provide a power transfer to a power receiver via a wireless inductive power transfer signal, the power transfer signal during a power transfer phase being provided in a power time interval of a repeating power transfer signal time frame, the power transfer signal time frame furthermore comprising a reduced power time interval, a power of the power transfer signal being reduced for the reduced power time interval relative to the power time interval; the apparatus comprising: a power transfer inductor for transferring of the power transfer signal; a communication antenna for short range communication; a short range communication unit arranged to communicate data messages with a second entity being at least one of the power transmitter and the power receiver using the short range communication, the short range communication having a range not exceeding 20 cm and using a separate carrier signal than the power transfer signal; and a synchronizer arranged to synchronize the short range communication to the power transfer signal time frame such that short range communication is restricted to the reduced power time intervals.

The invention may provide improved communication and/or improved, more reliable or even potentially safer operation in many power transfer systems.

The approach may specifically in many scenarios provide the benefits of using a separate communication channel separate from the power transfer signal without introducing the potential risks and disadvantages normally associated therewith.

The invention may allow improved interworking between separate systems based on electromagnetic signals. The approach may allow separated power provision and communication thereby allowing individual optimization of each. In addition, the approach may mitigate interference between different systems that both are based on electromagnetic signals coexisting in a small space. In particular, the approach may allow communication to be separated from power provision while still performing communication during the power transfer phase wherein a very strong magnetic field is generated by the power transfer signal.

Indeed, the invention may combine the use of a short range inductive power transfer with a short range communication system while avoiding or mitigating interference between these thereby allowing reliable operation to be achieved. The inventors have realized that using a separate communication link may introduce risks that the presence of more than one power receiver or power transmitter may result in undesired effects, and that these effects can be mitigated by using communication links with ranges comparable to the range of the inductive power transfer. The inventors have further realized that such short range communication and power transfer operations can be made to coexist and cooperate despite the apparent conflict between the needs for two short range magnetic fields (and especially with the power transfer signal magnetic field being a very strong magnetic field).

The approach may thus provide benefits by having very short ranges of both power transfer and communication while at the same time overcoming the disadvantages of both the power transfer and communication being short range. The approach may specifically overcome the prejudice that short range communication is not practical in wireless power transfer systems due to strong interference resulting from providing power to the power receiver. The invention may modify the power transfer operation in order to accommodate requirements of the communication. Thus, rather than the conventional approach of adapting the communication approach to fit in with a continuous power transfer requirement, the system takes the opposite approach and adapts the power transfer characteristics to the requirements associated with introducing a short range communication system. Thus, the power transfer operation in terms of power provision may be traded off with the communication performance and the operational benefits of using a short range communication system.

The approach may specifically allow a more reliable operation and may reduce the risk of interference between the operations of multiple power transfer entities (receivers or transmitters) and power transfers which may be proximal to each other. The approach may also allow a substantially improved communication, including bidirectional communication, higher data rate communication and/or a more reliable communication.

If the apparatus is a power transmitter, the second entity may be a power receiver. If the apparatus is a power receiver, the second entity may be a power transmitter.

The communication range of 20 cm may in some embodiments be measured in a given direction, and specifically in the direction of a plane in which a planar power transmitter coil is formed for radiating the power transfer signal.

The synchronizer unit may be arranged to synchronize the data exchange to take place in the reduced power time intervals. The synchronizer may in some embodiments synchronize a transmitting function of the apparatus to transmit data only in reduced power time intervals. In some embodiments or scenarios, the transmitting function may transmit e.g. a carrier in other time intervals (specifically in the power time intervals) but may restrict the communication of data to be in the reduced power time intervals. The synchronizer may in some embodiments synchronize a receiving function of the apparatus to receive data only in the reduced power time intervals.

In some embodiments, the short range communication is arranged to transmit data (messages) only in the reduced power time intervals.

In some embodiments, the short range communication is arranged to receive data (messages) only in the reduced power time intervals.

In some embodiments, the communication range may not exceed 10 cm.

In most embodiments, the duration of the reduced power time intervals will be lower, and typically substantially lower, than the duration of the power time intervals. In many embodiments, the duty cycle may not exceed 20%, 10% or even 5%. The exact duty cycle may provide an advantageous trade-off between communication capacity and power transfer efficiency. For many power transfer systems, an advantageous trade-off is found for a duty cycle of no more than 10%.

A duration of the reduced power time intervals may in many embodiments advantageously be in the range from 1 msec to 5 msec, and/or the duration of the power time intervals may in many embodiments advantageously be in the range from 5 msec to 10 msec.

In many embodiments, the duration of a time frame is no less than 5 msec. and no more than 200 msec. The time frame may be a periodically repeating time frame, and may typically have a repetition frequency of no less than 5 Hz and no more than 200 Hz.

In accordance with an optional feature of the invention, a carrier frequency of the carrier is no less than twice a frequency of the power transfer signal.

This may provide improved performance in many embodiments, and may specifically typically provide reduced interference to the short range communication from the power transfer signal.

In accordance with an optional feature of the invention, a power level of the power transfer signal during a reduced power time interval in a first time frame is no more than 20% of a power level of the power transfer signal during a power time interval during the first time frame.

This may provide improved performance.

The power of the power transfer signal in the reduced power time intervals may typically be limited to be no more than 20%, 10% or 5% of the maximum power possible in a power time interval. In many scenarios, the power transfer signal in the reduced power time intervals may be no more than 20%, 10% or 5% of the power in adjacent power time intervals. In many embodiments, the reduced power time intervals may substantially correspond to power-off time intervals. In many embodiments, the power transmitter may be arranged to switch off the power transfer signal during the reduced power time intervals. In such power-off time intervals, no power transfer signal may be generated. The short-range communication may be a Near Field Communication, NFC, communication.

The inventors have realized that power transfer systems, such as the Qi system, can be modified to allow the NFC communication standard to be used for (bidirectional) communication between a power receiver and a power transmitter and that this may allow improved and more reliable operation.

In particular, NFC may in comparison to other communication approaches such as Bluetooth™ or WiFi™ provide a more reliable operation with reduced risk of communications from different devices being confused. The approach allows for NFC to be used with a power transfer system despite the communication utilizing near field communication and thus operating were the power transfer also induces a very strong magnetic field.

The approach may reduce cost and provide a communication which is particularly suitable for power transfers as a sufficiently high data rate can be achieved while restricting the communication to very small ranges, typically ensuring that only one other communication entity may be present within the given range.

In accordance with an optional feature of the invention, the short range communication unit is operable to operate as an initiator initiating a short range communication link to the second entity.

In some embodiments and scenarios, the apparatus may operate as an initiator and the second entity may operate as a target. In some embodiments and scenarios, the second entity may operate as an initiator and the apparatus may operate as a target.

For example, the apparatus may be a power transmitter and may operate as an initiator which initiates the NFC communication with the power receiver. As another example, the apparatus may be a power receiver and may operate as an initiator which initiates the NFC communication with the power transmitter.

In accordance with an optional feature of the invention, the short range communication unit is arranged to reply to a data message received from the second entity in the reduced power time interval in which the data message is received from the second entity.

In some embodiments, bidirectional communication may be performed within a single time slot/interval. For example, the second entity may be an initiator and may transmit a first message to the apparatus in a given reduced power time interval. The apparatus may be a target and may respond to the first message by transmitting a second message to the second entity with the second message being transmitted within the same reduced power time interval in which the first message was received.

In some embodiments, the short range communication unit is arranged to receive a data message from the second entity in a reduced power time interval in which a data message is transmitted to the second entity. For example, the apparatus may be an initiator and may transmit a first message to the second entity in a given reduced power time interval. The second entity may be a target and may respond to the first message by transmitting a second message to the apparatus with the second message being transmitted within the same reduced power time interval in which the first message was received. The apparatus may be arranged to receive this second message in the same reduced power time interval in which it transmitted the first message.

In accordance with an optional feature of the invention, the short range communication unit is arranged to reply to a data message received from the second entity in a subsequent reduced power time interval to the reduced power time interval in which the data message is received from the second entity.

In some embodiments, bidirectional communication may be performed within two consecutive time slots/intervals. For example, the second entity may be an initiator and may transmit a first message to the apparatus in a given reduced power time interval. The apparatus may be a target and may respond to the first message by transmitting a second message to the second entity with the second message being transmitted in the next reduced power time interval, i.e. in the reduced power time interval which follows the interval in which the first message was received.

In some embodiments, the short range communication unit is arranged to receive a response data message from the second entity in subsequent reduced power time interval to a reduced power time interval in which a data message is transmitted to the second entity.

For example, the apparatus may be an initiator and may transmit a first message to the second entity in a given reduced power time interval. The second entity may be a target and may respond to the first message by transmitting a second message to the apparatus with the second message being transmitted in the next reduced power time interval, i.e. in the reduced power time interval which follows the interval in which the first message was received. The apparatus may be arranged to receive this second message in this following reduced power time interval, i.e. in the reduced power time interval following the one in which it transmitted the first message.

In accordance with an optional feature of the invention, the short range communication unit is arranged to perform at least a first operation prior to entering a power transfer phase, the at least first operation comprising an operation selected from: a detection of communication capability of the second entity; a communication collision detection; a communication session initialization between the apparatus and the second entity; a device activation of the second entity.

This may provide improved performance in many scenarios and may in particular ensure facilitated and/or more reliable operation. In particular, it may allow that a time frame optimized for the ongoing communication and control during the power transfer need not be compromised by e.g. timing requirements of procedures not performed regularly during such communication.

The communication collision detection may specifically be a detection of other short range communication units operating and specifically transmitting within the communication range of the short range communication unit.

In accordance with an optional feature of the invention, the short range communication unit is arranged to repeatedly transmit an identification of the apparatus to the second entity.

The approach may further improve reliability and ensure that the communication is between the intended power transmitter and power receiver despite using a communication link separate from the power transfer signal. The approach may specifically allow the second entity to check that it receives data messages from the intended source.

In accordance with an optional feature of the invention, the apparatus further comprises a power transfer controller arranged to inhibit power transfer in response to not receiving an indication of an identity of the second entity matching an expected identification value.

The approach may further improve reliability and ensure the communication is between the intended power transmitter and power receiver despite using a communication link separate from the power transfer signal. The approach may specifically reduce the risk of an undesired high power transfer level resulting from the communication being with a second entity not involved in the power transfer.

In accordance with an optional feature of the invention, the apparatus is the power transmitter.

The invention may provide an improved power transmitter that can support improved operation in a power transfer system. In particular, improved and more reliable communication can be provided thereby allowing improved power transfer.

In accordance with an optional feature of the invention, the apparatus further comprises a power source for providing a periodically varying power source signal, a frequency of periodic variations in the power source signal being less than 1 kHz; a power transfer signal generator for generating a drive signal for a power transmit inductor from the power source signal, the power transfer signal generator comprising: a frequency converter arranged to generate a frequency of the drive signal to be higher than the frequency of periodic variations in the power source signal, and a limiter for restricting a power of the drive signal fed to the power transmit inductor to be below a threshold in the reduced power time intervals; and a power source synchronizer for synchronizing the reduced power time intervals to periodic variations in the power source signal.

This may allow improved performance, and may in particular allow the impact on the power transfer to be reduced.

In many embodiments, the power source signal is a varying DC power transfer signal.

In some embodiments, the power source is arranged to generate the power source signal in response to a rectification of an AC signal, and the reduced power time intervals may be synchronized to zero crossings of the AC signal.

In some embodiments, the limiter may be arranged to decouple the power transmit inductor from the frequency converter during the reduced power time intervals.

In many embodiments, the reduced power time intervals correspond to time intervals for which a level of the power source signal is below a threshold.

This may allow improved power transfer in many embodiments.

In many embodiments, the reduced power time intervals correspond to time intervals for which a level of the power source signal is below a threshold. The power source synchronizer may select the reduced power time intervals to be time intervals in which the level of the power source signal is below a threshold.

In many embodiments, the power transfer signal generator may be arranged to generate the power transfer signal to have a frequency of no more than five times the frequency of the periodic variations, and typically to have a frequency substantially identical to or twice the frequency of the periodic variations.

In accordance with an optional feature of the invention, the power source synchronizer is arranged to synchronize the reduced power time intervals to correspond to periodic minima of an absolute of the power source signal.

This may provide improved performance. The power source synchronizer may specifically be arranged to synchronize the reduced power time intervals to correspond to zero crossings of the power source signal. The absolute of the power source signal may correspond to a rectified power source signal. The power source synchronizer is arranged to synchronize the reduced power time intervals to correspond to periodic minima of an absolute value of the power source signal. The value may be a power, voltage or current value.

In accordance with an optional feature of the invention, the short range communication unit is arranged to perform a detection of possible communication entities that can be communicated with by short range communication, and the apparatus further comprises a power transfer controller arranged to inhibit power transfer if more than one possible communication entities are detected.

The approach may allow improved reliability and may reduce the risk of a power transmitter unintentionally communicating with a power receiver that is not the target of the power transfer.

For example, the power transmitter may perform a collision detection (e.g. an NFC collision resolution) to detect other communication entities within range. The power transmitter may inhibit power transfer if more than one other communication entity is detected. The power transfer may be inhibited by limiting the power of the power transfer signal to a given level (corresponding to safe operation) or e.g. by switching off the power transfer signal, or terminating (or not continuing with or starting) the power transfer operation.

In accordance with an optional feature of the invention, the apparatus further comprises a power transfer controller arranged to inhibit power transfer in response to a detection that a response message expected from the second entity is not received within a time interval.

The approach may further improve reliability and ensure that power is only provided if the communication is indeed with the power receiver involved in the power transfer. The power transfer may be inhibited by limiting the power of the power transfer signal to a given level (corresponding to safe operation), or e.g. by switching off the power transfer signal, or by terminating (or not continuing with or starting) the power transfer operation.

In accordance with an optional feature of the invention, the apparatus further comprises a power transfer controller arranged to inhibit power transfer in response to a detection of an absence of a radio signal from the second entity.

The approach may further improve reliability and ensure that power is only provided if the communication is indeed with the power receiver involved in the power transfer. The power transfer may be inhibited by limiting the power of the power transfer signal to a given level (corresponding to safe operation), or e.g. by switching off the power transfer signal, or by terminating (or not continuing with or starting) the power transfer operation.

The approach may for example be applied to NFC communication where the second entity is an initiator supposed to generate a carrier signal and where the communication unit (of the first entity) is a target.

In accordance with an optional feature of the invention, the apparatus is the power receiver.

The invention may provide an improved power receiver that can support improved operation in a power transfer system. In particular, improved and more reliable communication can be provided thereby allowing improved power transfer.

The communication unit may in some embodiments comprise a passive NFC tag.

In accordance with an optional feature of the invention, the apparatus further comprises a controller arranged to reduce a power to a load of the power receiver in response to a detection of an absence of a communication signal from the second entity.

The approach may allow improved and/or more reliable operation and may avoid potentially providing excessive power to a load in scenarios wherein a power transfer signal may be provided by a power transmitter not controlled by the power receiver.

The reduction of power to the load may be by disconnecting a power receive coil (for receiving the power transfer signal) from the load, and or by short circuiting the load.

In accordance with an optional feature of the invention, the apparatus further comprises a user interface arranged to generate a user alert in response to a detection of an absence of a communication signal from the second entity.

The approach may allow improved and/or more reliable operation and may alert the user to a potential scenario wherein power may be provided to the power receiver by a power transmitter not controlled by the power receiver.

In accordance with an optional feature of the invention, the short range communication unit is arranged to inhibit communication link termination with the second entity in response to a detection of the power transfer signal being present.

The approach may allow improved and/or more reliable operation and may reduce the risk of the power transfer to the power receiver being controlled by another power receiver.

In accordance with an optional feature of the invention, the synchronizer is arranged to determine a timing of the power transfer signal time frame in response to power variations of the power transfer signal.

This may allow reliable operation and may in particular provide an efficient, reliable, and low complexity approach for synchronizing the communication functionality of the power receiver.

According to an aspect of the invention there is provided a method of operation for a wireless power transfer system including a power transmitter arranged to provide a power transfer to a power receiver via a wireless inductive power transfer signal, the power transfer signal being provided in a power time interval of a repeating power transfer signal time frame, the power transfer signal time frame furthermore comprising a reduced power time interval, a power of the power transfer signal being reduced for the reduced time interval relative to the power time interval; the method comprising during a power transfer phase performing the steps of: communicating data messages with a second entity being at least one of the power transmitter and the power receiver using short range communication based on a separate carrier signal than the power transfer signal and using a communication antenna different from a power transfer inductor for transferring of the power transfer signal, the short range communication having a range not exceeding 20 cm; and synchronizing the short range communication to the power transfer signal time frame such that short range communication is restricted to the reduced power time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Qi type power transfer system but it will be appreciated that the invention is not limited to this application but may be applied to many other power transfer systems.

Figure 1:
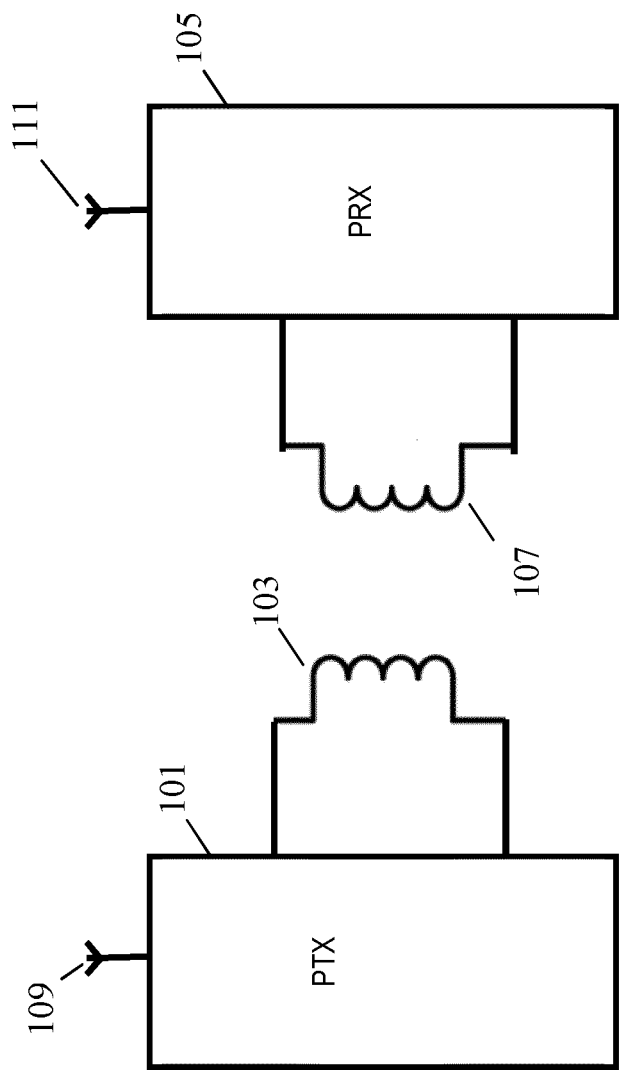
FIG. 1 illustrates an example of a power transfer system comprising a power transmitter and a power receiver in accordance with some embodiments of the invention.

FIG. 1 illustrates an example of a power transfer system in accordance with some embodiments of the invention. The power transfer system comprises a power transmitter 101 which includes (or is coupled to) a transmit power transfer coil/inductor which henceforth will be referred to as the transmitter coil 103. The system further comprises a power receiver 105 which includes (or is coupled to) a receive power transfer coil/inductor which henceforth will be referred to as the receiver coil 107.

The system provides a wireless inductive power transfer from the power transmitter 101 to the power receiver 105. Specifically, the power transmitter 101 generates a power transfer signal which is propagated as a magnetic flux by the transmitter coil 103. The power transfer signal may typically have a frequency between around 20 kHz to 200 kHz. The transmitter coil 103 and the receiver coil 107 are loosely coupled and thus the receiver coil picks up (at least part of) the power transfer signal from the power transmitter 101. Thus, the power is transferred from the power transmitter 101 to the power receiver 105 via a wireless inductive coupling from the transmitter coil 103 to the receiver coil 107. The transmitter coil 103 and the receive coil 107 are thus arranged to transfer the power transfer signal across from the power transmitter 101 to the power receiver 105. The term power transfer signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In some embodiments, the receive power transfer coil 107 may even be a receive power transfer entity which when exposed to the inductive power transfer signal is heated up due to the induced eddy currents or additionally by hysteresis losses due to ferromagnetic behavior. For example, the receive coil 107 may be an iron plate for an appliance that is inductively heated. Thus, in some embodiments, the receive coil 107 may be an electrically conductive element which is heated by induced eddy currents or additionally by hysteresis losses due to ferromagnetic behavior. In such an example, the receive coil 107 thus also inherently forms the load.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 105 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power transfer signal is temporarily generated. The signal is known as a ping signal. The power receiver 105 can apply the received signal to power up its electronics. After receiving the power transfer signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and in conventional Qi systems a power receiver 105 in this phase communicates to the power transmitter 101 using load modulation. In such systems, the power transmitter provides a power transfer signal of constant amplitude, frequency and phase for this purpose (with the exception of the change caused by load-modulation). The messages are used by the power transmitter 101 to configure itself as requested by the power receiver 105. The messages from the power receiver are not communicated continuously but are communicated in intervals.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power transfer signal. Thus, in the power transfer phase, the power receiver 105 also communicates with the power transmitter.

The power transfer system of FIG. 1 utilizes communication between the power transmitter 101 and the power receiver 105.

An approach for communication from a power receiver to a power transmitter has been standardized in the Qi Specification version 1.0 and 1.1.

In accordance with this standard, a communication channel from the power receiver to the power transmitter is implemented using the power transfer signal as carrier. The power receiver modulates the load of the receiver coil. This results in corresponding variations in the power transfer signal at the power transmitter side. The load modulation may be detected by a change in the amplitude and/or phase of the transmitter coil current, or alternatively or additionally by a change in the voltage of the transmitter coil. Based on this principle, the power receiver can modulate data which the power transmitter demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

It is noted that the Qi wireless power specification versions 1.0 and 1.1 define only communication from the power receiver to the power transmitter, i.e. it defines only a unidirectional communication.

The system of FIG. 1 uses a different approach to communication than that disclosed in the Qi wireless power specification versions 1.0 and 1.1. However, it will be appreciated that this different approach to communication may be used together with other communication approaches, including the communication approach of the Qi wireless power specification versions 1.0 and 1.1. For example, for a Qi type system, the communication approach of Qi wireless power specification versions 1.0 and 1.1 may be used for all communication that is specified to be performed by the Qi wireless power specification versions 1.0 and 1.1, but with additional communication being supported by the different approach described in the following. Also, it will be appreciated that the system may communicate in accordance with the Qi wireless power specification versions 1.0 and 1.1 in some phases or modes but not in others. For example, it may use standard load modulation during the Identification and Configuration phase where the power transfer signal and external loads may be constant but not during the power transfer phase where this is not the case.

In the system of FIG. 1, communication between the power receiver 105 and power transmitter 101 is enhanced with respect to the standardized communication of Qi wireless power specification versions 1.0 and 1.1.

Firstly, the system supports communication of messages from the power transmitter 101 to the power receiver 105, and in particular allows the power transmitter 101 to transmit data to the power receiver 105. Secondly, the communication from the power receiver 105 to the power transmitter 101 may use an enhanced communication and may not be limited to communication by load modulation.

In particular, the system of FIG. 1 utilizes a second communication link which is independent of the power transfer signal in the sense that it does not involve any modulation of the power transfer signal or use the power transfer signal as a carrier. The communication link is a short range communication link with a range of no more than 20 cm. Thus, communication is only guaranteed up to a distance of 20 cm. In some embodiments, the range is no more than 10 cm. Indeed, in many embodiments, typical communication ranges may be in the neighborhood of a few centimeters.

The short range communication link may specifically be an NFC communication link.

In many embodiments, the second communication link is formed by short range communication which is independent of the power transfer and the power transfer signal. The short range communication system specifically does not use the power transfer signal but is independent of the presence of this. The short range communication can be performed even when the power transfer signal is not present, indeed the short range communication may often be more reliable and have reduced error probabilities when the power transfer signal is not present. Thus, instead of the conventional approach where the same signal is used for both power transfer and for communication, the system of FIG. 1 provides differentiated communication and power transfer by the communication being based on modulating a separate carrier rather than modulating the power transfer signal (although some communication between the power transmitter 101 and power receiver 105 may possibly additionally be performed using the power transfer signal, such as e.g. legacy communication during the identification and configuration phase).

The short range communication furthermore uses different inductors for communicating the communication carrier/signal than for transferring the power transfer signal from the power transmitter 101 to the power receiver 105. Specifically, the communication carrier is transferred using short range communication antennas 109 and 111, and do not use the transmitter coil 103 or the receive coil 107.

The short range communication furthermore uses different inductors for communicating the communication carrier/signal than for transferring the power transfer signal from the power transmitter 101 to the power receiver 105. Specifically, the communication carrier is transferred using short range communication antennas and do not use the transmitter coil 103 or the receive coil 107.

Thus, the short range communication and the power transfer are in the system of FIG. 1 substantially independent and separate functions and systems. However, whereas the use of such different and independent systems may provide a number of advantages, there may also be a number of difficulties associated. Specifically, in a system where two independent systems are both based on electromagnetic signals that coexist in the same space, the systems will cause interference to each other. In particular, the very strong electromagnetic field generated by the power transfer signal will cause a high degree of interference which may substantially impact the short range communication.

The system of FIG. 1 allows such a short range communication link to co-exist with the strong magnetic signal generated by the power transmitter 101 for the power transfer by adapting the power transfer signal to use a time division time frame and by synchronizing the short range communication to this time frame.

In particular, rather than use a continuous power transfer as in existing systems, the current systems applies a time frame to the power transfer signal. The time frame comprises at least two types of time intervals/time slots, namely power time intervals in which a power transfer signal having the power required for the power transfer is generated and a reduced power time interval in which only a reduced power level power transfer signal is provided. Indeed, in many embodiments, the power transfer signal may be completely switched off during the reduced power time intervals. The approach of adapting the power transfer operation and effectively making this discontinuous allows the short range communication to co-exist with the power transfer. The approach allows the short range communication to be performed during the power transfer phase. Thus, during the power transfer phase where power is being transferred to the power receiver 105, the power transmitter 101 generates a very strong power transfer signal in order to generate the required power to the power receiver 105. Such a strong signal may often cause very substantial interference to short range communication which indeed is operating in the location where the power transfer signal is strongest.

The approach may address a number of disadvantages associated with conventional approaches.

For example, it may overcome the disadvantages of using the power transfer signal as a carrier signal for the communication. For example, for many loads, such as motors, the dynamic variations are very significant and this may in many scenarios make load modulation relatively unreliable or even unfeasible. Also, modulation of the power transfer signal tends to be relatively slow and result in very low communication data rates.

However, using a separate communication link, such as an NFC communication link, together with the synchronized time division approach, allows the power transfer characteristics to be decoupled from the communication link thereby allowing more reliable and faster communication. In addition, the short range communication provides increased protection against operational interference from other power transfer operations being performed close to the power transfer.

Indeed, if separate communication channels are used, this could result in interference between the operations of different power transfers which could result in a potentially dangerous situation with high power levels. For example, the control operations may interfere with each other, e.g. by the control data from the power receiver of one power transfer operation being used to control the power transfer to another nearby power receiver. The separation between communication and power transfer signals may result in less robust and less fail safe operation.

In particular, communication by load modulation inherently tends to ensure that the data is communicated between the correct power receiver 105 and power transmitter 101, i.e. the power transmitter 101 can reliably assume that the received data can be used to control the power transfer operation. However, the Inventors have realized that when a separate communication link, which is independent of the power transfer signal, is used, there is a risk that the data transmitted from the power receiver 105 may not be received by the power transmitter 101 that delivers power to power receiver 105, or may be received by a power transmitter 101 that does not deliver power to the power receiver 105. Similarly, there is a risk that data received by the power transmitter 101 has not originated from the expected power receiver 105.

The issue may be particularly significant for situations where a plurality of power transmitters that are positioned within a limited area may simultaneously transfer power to a plurality of power receivers.

The issue may also be particularly significant for power transmitters that include a plurality of transmit coils and which are capable of simultaneously supporting a plurality of power transfers.

As an example, the use of a separate RF communication link may not require that the power receiver 105 is positioned correctly for the communication to be carried out. Specifically, the fact that it is possible to carry out a successful communication will typically not guarantee that the receive coil 107 is positioned sufficiently close to the transmit coil 103. If a power receiver controls a power transmitter via such communication channel, the system can therefore not be certain that the receive coil is positioned sufficiently close to the transmit coil (and thus the coupling between the receive coil and the transmit coil may be very low). It is possible that the power receiver keeps requesting the power transmitter to power up until the provided power is sufficiently high for the power receiver to receive sufficient power even with the current inefficient coupling. However, this may require a very strong magnetic field to be induced and this could lead to unexpected and undesirable exposure of the user or metal objects to the magnetic field generated by the power transmitter.

The power transmitter and power receiver may include additional functionality for verifying and checking the position of the power receiver but such additional functionality will typically add complexity and cost.

Also, the simultaneous use of multiple appliances with individual power receivers could lead to a situation where a first power receiver coupled to a first power transmitter interferes with a second power receiver coupled to a second power transmitter. The control signals of the first power receiver could be picked up by the second power transmitter or vice versa. This could for example result in the second power transmitter being controlled to generate a high magnetic field that is not appropriate for the second power receiver. For example, if the first power receiver detects that the level of the power transfer signal should be increased, it may request a power up. However, this request could be received by the second power transmitter instead of the first power transmitter, and it will then result in the power transfer signal provided by the second power transmitter to the second power receiver being increased. The first power receiver will still detect that the level of the power transfer signal is too low (as the power transfer signal from the first power transmitter has not changed), and it will therefore continue to request a power up. Thus, the second power transmitter will continue to increase the power level. This continuous power up could lead to damage, excessive heat generation, and in general to an undesirable and even potentially unsafe situation for the second power receiver and the associated appliance.

As a specific exemplary scenario to illustrate the issue, a user may put a kettle on top of a first power transmitter in the kitchen. The first power transmitter may detect that an object is placed on its power transfer interface and it may provide a power transfer signal with low power to the kettle in order start up its electronics. The kettle sends information via the RF communication link to the power transmitter in order to initiate and control the power transmitter to provide power. After some time, the user may decide to put a pan on the first power transmitter and accordingly he may move the kettle to a second power transmitter near the first power transmitter. The second power transmitter detects the kettle and will under control of the kettle transfer power to this. The first power transmitter may detect the pan, but will still receive the control data from the kettle. The first power transmitter will therefore provide power to the pan but the power transfer signal will be controlled by the kettle resulting in possibly an unexpected heating of the pan. The user will typically not be aware of the situation and may e.g. touch the pan which may be inappropriately hot.

As another example, the same scenario may be encountered but with the addition of a non-heat resistive countertop. The kettle may be constructed such that it does not heat the surface on which it is positioned even when the water in the kettle has reached boiling point. The pan could be a conventional pan suitable for induction cooking, but only intended to be used on a ceramic glass plate. In this situation, the pan could damage the non-heat resistive countertop, because it does not contain any means to limit the dissipation of the energy when the first power transmitter is still under control of the kettle while the pan is positioned on the first power transmitter.

Figure 2:
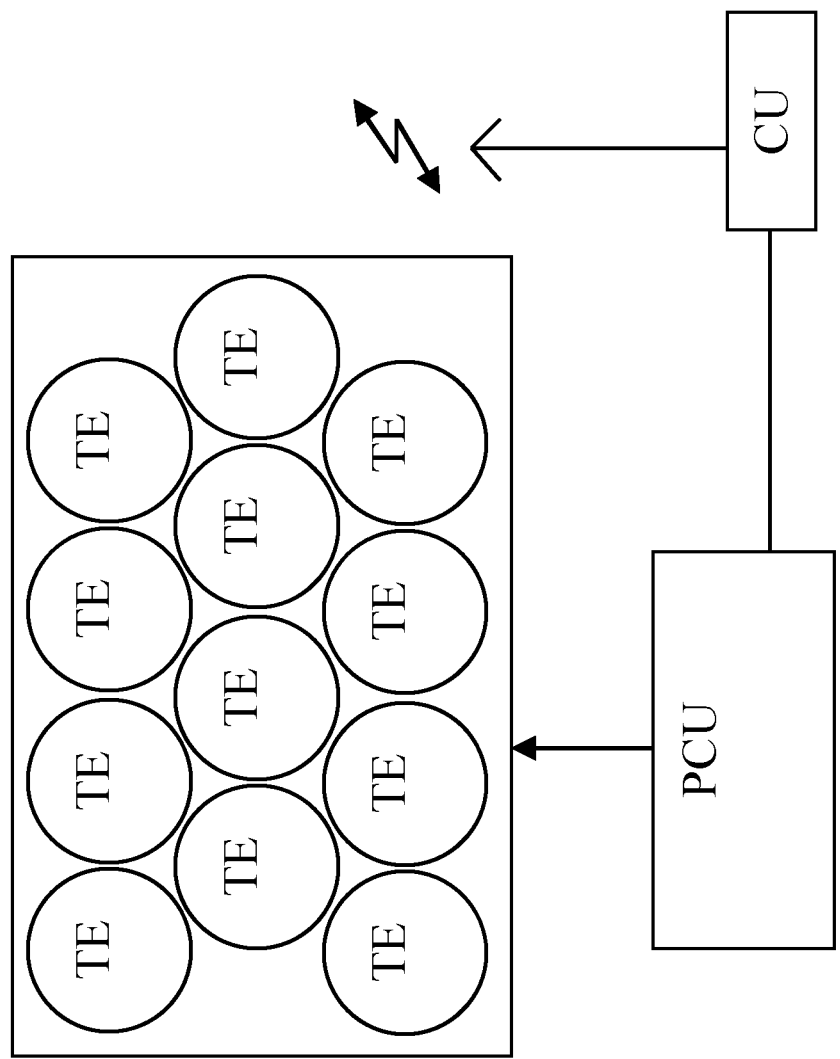
FIG. 2 illustrates an example of elements of a power transmitter in accordance with some embodiments of the invention.

Issues may also arise e.g. in scenarios where the power transmitter may comprise a plurality of transmit coils. For example, as illustrated in FIG. 2, a power transmitter may comprise a power controller PCU which controls a plurality of transmit elements TE each comprising a transmit coil. At the same time, a separate communication unit CU may receive data from a separate RF communication link. In such a scenario, a first power receiver may be positioned on a first of the transmit elements/coils TE. For example, a mobile phone may be positioned on the transmit coil array, and a power transfer to the mobile phone may start. The mobile phone may transmit control data back to the power transmitter using the RF communication link, and the power transfer signal of the first transmit coil TE may be arranged in accordance. The user may now desire to charge a second mobile. He may move the first mobile phone slightly to one side in order to make room for the new phone which may result in the first mobile phone now being positioned over a different transmit coil, such as e.g. over a neighboring transmit coil. However, this may not be detected by the system and indeed the reverse communication link from the first mobile phone will still work. The first mobile phone will request power ups to compensate for the low coupling resulting in a very large magnetic field potentially being generated by the first transmit coil. Indeed, in many scenarios, the second mobile phone could potentially be positioned on top of the first transmit coil and it would consequently experience the high magnetic field without any chance of reducing it. Thus, the control of the power transfer may effectively be lost, and indeed in some scenarios the power transfer for one mobile may be controlled by the other and vice versa.

The use of a short range communication link such as NFC ensures that although a separate communication link independent of the power transfer signal is used, there is a guaranteed geometric relationship between the power transmitter 101 and the power receiver 105. In many embodiments, this may be sufficient to alleviate or overcome the described problems. For example, by ensuring that the only power receiver 105 within a range of 20 cm of the transmit coil 103 is indeed the power receiver 105 involved in the power transfer, it can be ensured that the communication is indeed between the power receiver 105 and power transmitter 101 performing the power transfer. Indeed, even in scenarios where this perhaps cannot be guaranteed, the probability of an issue arising can be reduced substantially.

The following description will focus on embodiments wherein the communication link that is independent of the power transfer signal is an NFC communication link.

Figure 3:
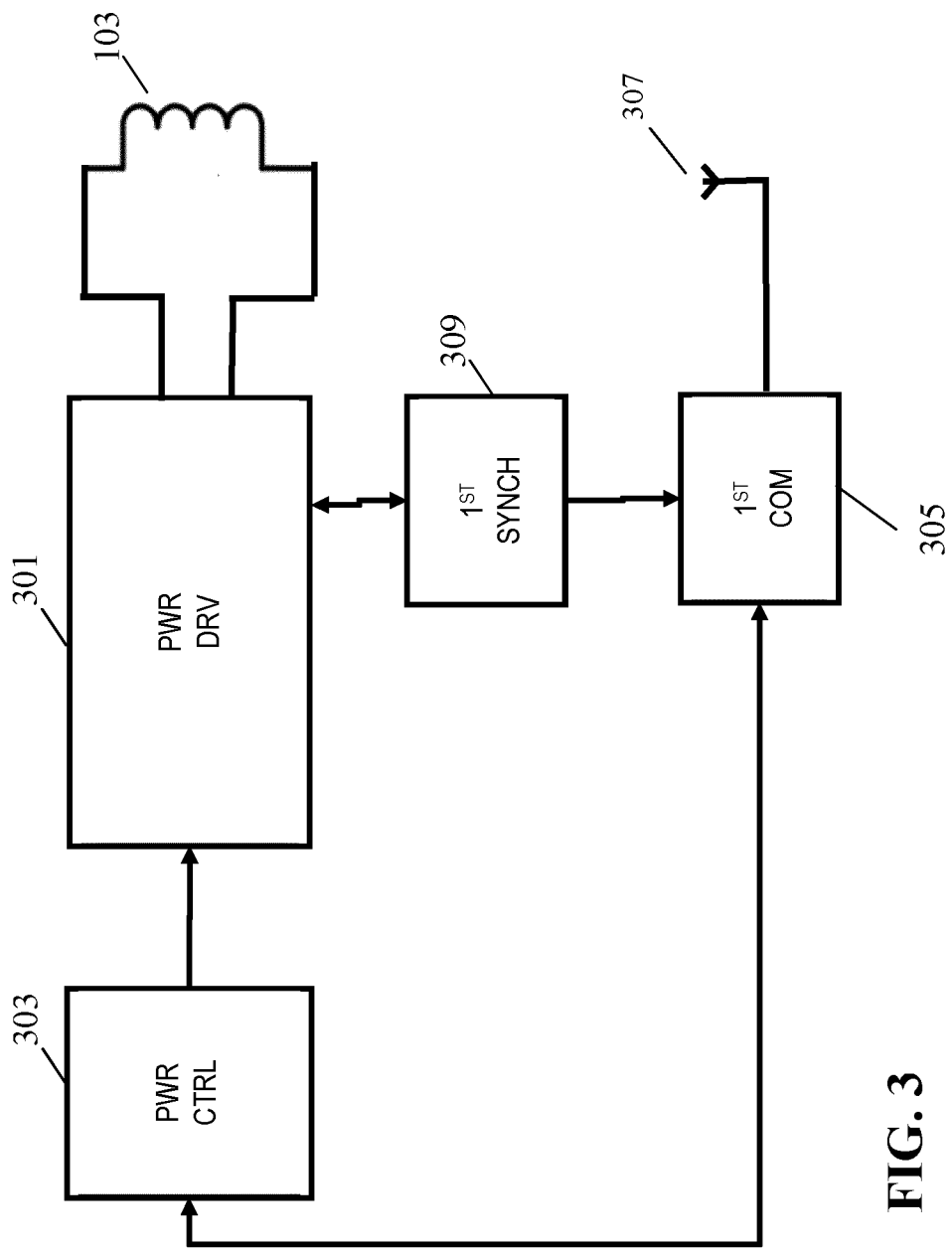
FIG. 3 illustrates an example of elements of a power transmitter in accordance with some embodiments of the invention.
Figure 4:
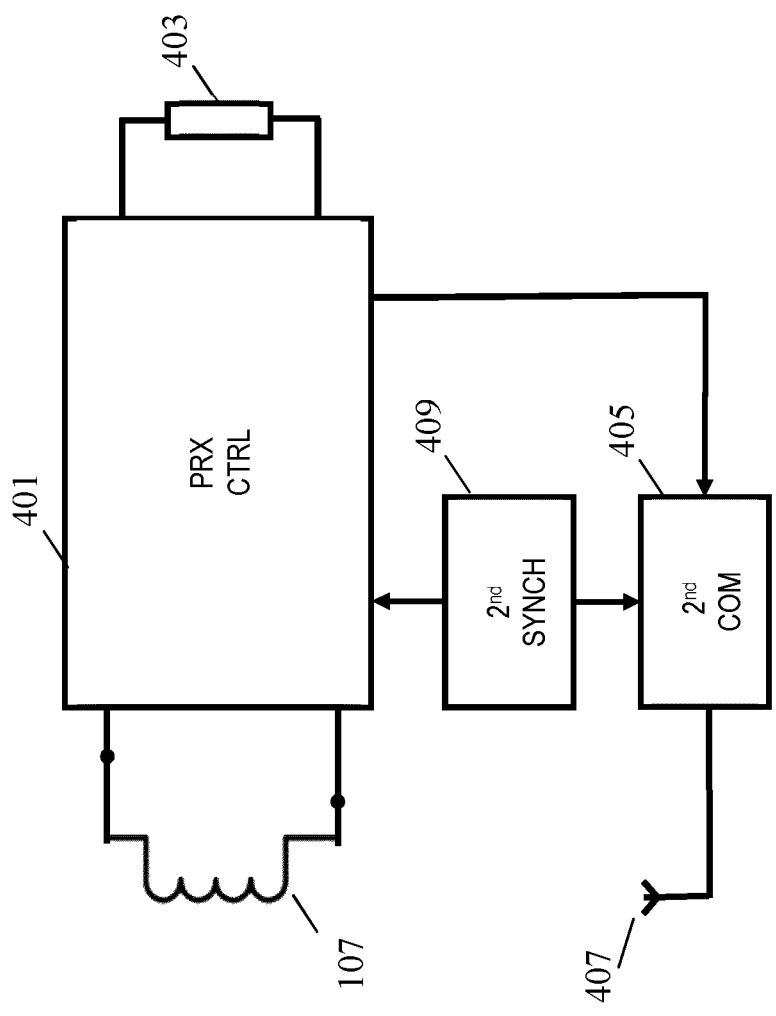
FIG. 4 illustrates an example of elements of a power receiver in accordance with some embodiments of the invention.

FIG. 3 illustrates elements of the power transmitter 101 of FIG. 1 in more detail and FIG. 4 illustrates elements of the power receiver 105 of FIG. 1 in more detail.

The power transmitter 101 comprises the transmit coil 103 which is coupled to a driver 301 that is arranged to generate the drive signal of the transmit coil 103, and thus is arranged to generate the drive signal which is translated into the inductive power transfer signal. The driver 301 is arranged to generate an AC signal with a desired power level which is fed to the transmit coil 103 to generate the power transfer signal. It will be appreciated that the driver 301 may comprise suitable functionality for generating the drive signal as will be well known to the person skilled in the art. For example, the driver 301 may comprise an inverter for converting a DC power supply signal into an AC signal of a suitable frequency (typically around 50-200 kHz) for the power transfer. It will also be appreciated that the driver 301 may comprise suitable control functionality for operating the different phases of the power transfer system. In many cases, the driver 301 will contain one or more capacitors in order to realize a resonance circuit with the power coil 103 for a chosen frequency.

The driver 301 is coupled to a power controller 303 which is arranged to control the power of the power transfer signal. Specifically, the power controller 303 may generate a control signal which is fed to the driver 301 and which indicates the power level for the drive signal. The driver 301 can then scale the drive signal to have a corresponding amplitude.

The power transmitter 101 furthermore comprises a first communication unit 305 which is arranged to communicate with the power receiver 105. Specifically, the first communication unit 305 can communicate data to the power receiver 105 on a forward communication link and receive data from the power receiver 105 on a reverse communication link. The communication links are short range RF communication links and accordingly the power transmitter 101 also comprises an antenna 307 coupled to the first communication unit 305.

The antenna 307 may be any element suitable for converting an electrical signal into an electromagnetic communication signal, such as specifically an electromagnetic radiator, antenna, inductor or coil.

In the specific example, the first communication unit 305 is an NFC communication unit and thus the communication links are NFC communication links. The antenna 307 may specifically be an NFC planar coil.

The first communication unit 305 may thus exchange data messages with the power receiver 105 using short range communication, and specifically using NFC communication. The range of the communication is limited to no more than 20 cm and in many embodiments to no more than 10 cm. Typical communication links may be over distances of only a few cm.

The communication range may be the maximum distance between the antennas which allow reliable communication. Reliable communication may be considered to require an error rate to be below a threshold, such as e.g. a bit error rate of less than $10^{-3}$.

The first communication unit 305 may transmit data messages to the power receiver 105 over the NFC communication link or may receive data messages from the power receiver 105 over the NFC communication link. Specifically, the first communication unit 305 may transmit a forward message to the power receiver 105 over the NFC communication link with the power receiver 105 being expected to respond by transmitting a response message back to the power transmitter 101 over the NFC communication link. The response message may e.g. be required to confirm that the reverse communication link is indeed a link with the power receiver 105 that is taking part in the power transfer.

In some embodiments, only one of the communication links may be established by the short range (NFC) communication. For example, in some embodiments, the forward communication link may be established using modulation of the power transfer signal whereas the reverse communication link is established using NFC communication. As another example, in some embodiments, the reverse communication link may be established using load modulation of the power transfer signal whereas the forward communication link is established using NFC communication.

The power receiver 105 comprises a power transfer controller 401 which is coupled to the receive coil 107 and which receives the power transfer signal. The power transfer controller 401 is further coupled to a load 403 and is capable of receiving the power transfer signal and generating a suitable power supply signal for the load 403. The power transfer controller 401 may for example comprise a (full bridge) rectifier, smoothing circuitry, and voltage or power control circuitry as will be well known to the skilled person. In many cases, the power receiver contains one or more capacitors to realize a resonance circuitry with the receiver coil 107 for a chosen frequency.

The power transfer controller 401 is furthermore capable of controlling the power receiver 105 and specifically of supporting the transfer function operation including supporting the different phases of a Qi power transfer.

The power receiver 105 further comprises a second communication unit 405 which is a short range communication unit. Specifically, the second communication unit 405 can communicate data to the power transmitter 101 on a reverse communication link and receive data from the power transmitter 101 on a forward communication link. The communication links are short range RF communication links and accordingly the power receiver 105 also comprises an antenna 407 coupled to the second communication unit 405.

The antenna 407 may be any element suitable for converting an electromagnetic communication signal into an electrical signal, such as specifically an electromagnetic radiator, antenna, inductor or coil.

In the specific example, the second communication unit 405 is an NFC communication unit and thus the communication links are NFC communication links. The antenna 407 may specifically be an NFC planar coil.

The second communication unit 405 may thus exchange data messages with the power transmitter 101 using short range communication, and specifically using NFC communication. The second communication unit 405 may transmit data messages to the power transmitter 101 over the NFC communication link, or may receive data messages from the power transmitter 101 over the NFC communication link. Specifically, the second communication unit 405 may transmit a forward message to the power transmitter 101 over the reverse NFC communication link. The power transmitter 101 may then respond to this message by transmitting a response message back to the power transmitter 101 over the forward NFC communication link.

As another example, the power transmitter 101 may implement an NFC initiator and the power receiver 105 may implement an NFC target. The NFC initiator (i.e. the power transmitter 101) may send a request on the forward NFC communication link and the NFC target (i.e. the power receiver 105) may send a reply on the reverse NFC communication link. This reply may be, or may include, a confirmation that the forward NFC communication link is indeed a link to the correct power receiver 105.

The system accordingly utilizes a communication system which is separate from the power transfer and specifically, and which does not involve any modulation of the power transfer signal. However, in the system of FIGS. 1-4, the NFC communication is not merely implemented independently of the power transfer, but rather the operations are integrated and coordinated with each other. The integration is such that the power transfer and NFC communication operate in a synchronized and time division multiplexed arrangement.

Specifically, the power transfer is modified such that it is not a continuous power transfer, but rather a discontinuous power transfer signal is used. Indeed, both the power transfer and the NFC communication are arranged to operate in accordance with a repeating time frame. The repeating time frame comprises at least one time interval in which power transfer is performed. This time interval is thus referred to as a power time interval (or power transfer time interval). Each time frame furthermore comprises at least one time interval in which the power of the power transfer signal is reduced, and typically reduced to substantially zero. This time interval is accordingly referred to as a reduced power time interval.

Figure 5:
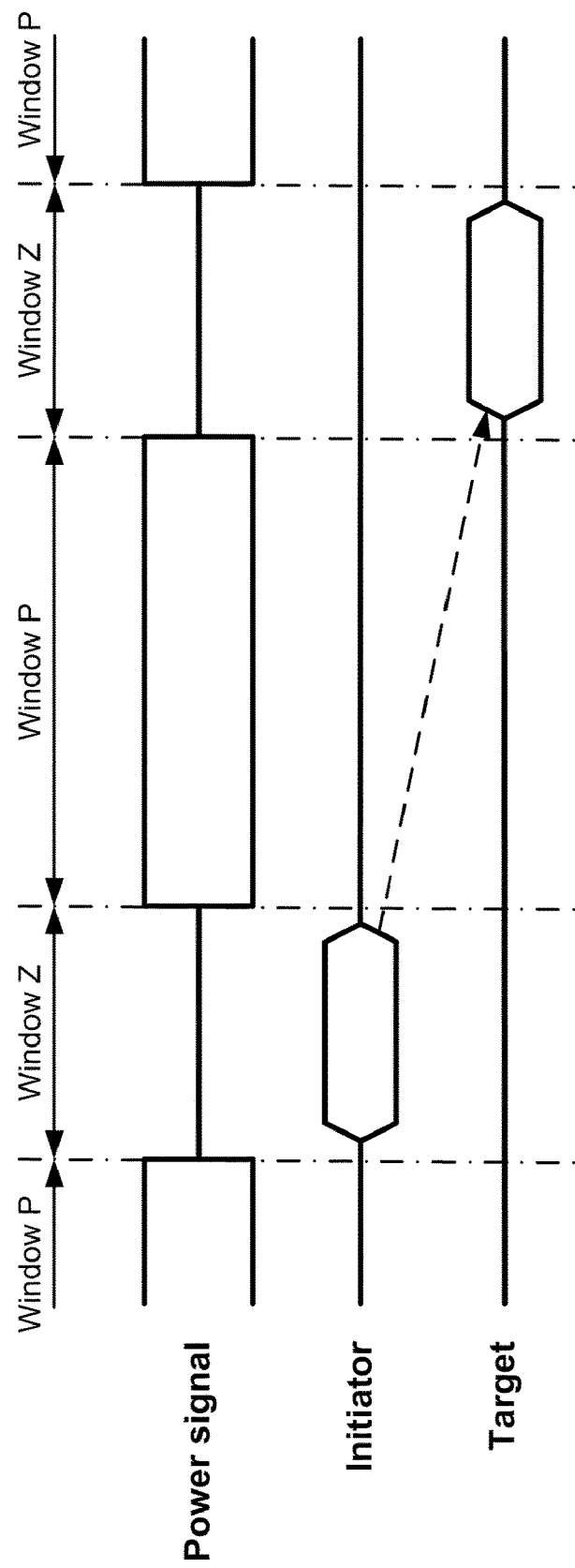
FIG. 5 illustrates an example of a possible timing diagram for signals of the power transfer system of FIG. 1.

FIG. 5 illustrates an example of a timing diagram for the system of FIG. 1.

In the example, each repeating time frame comprises one power time interval and one reduced power time interval. In the example, the power of the power transfer signal is reduced to zero in the reduced power time interval. In FIG. 5 the power time interval is referred to as "Window P" and the reduced power time intervals are referred to as "Window Z".

It will be appreciated that in some embodiments or scenarios, the power of the power transfer signal may not be reduced to zero in the reduced power time intervals but may be limited to a lower level being a level that is lower than the maximum possible power of the power transfer signal during the power time intervals, such as e.g. by restricting the power level to a power level for which the interference caused to the NFC communication is known to be acceptable.

In the system of FIG. 1, the NFC communication is not merely performed to meet the NFC communication standard but is also performed to be integrated with the power transfer operation, and specifically the NFC communication is performed synchronously with the time frame of the power transfer signal, i.e. it is synchronized with the power variations of the power transfer signal. Thus, in the system of FIG. 1, the functionality for providing power via the power transfer signal and the short range communication using the communication carrier are synchronized to each other, and indeed the communication carrier is synchronized to the power transfer signal. Furthermore, this synchronization of the communication and the power transfer is performed during the power transfer phase where the power transmitter 101 is providing power to the power receiver 105 thereby allowing or improving short range communication simultaneously with the transferring of power.

Specifically, the power transmitter 101 of FIG. 3 comprises a first synchronizer 309 coupled to the driver 301 and the first communication unit 305. The first synchronizer 309 is arranged to synchronize the short range (NFC) communication to the power transfer signal time frame such that the short range (NFC) communication is restricted to the reduced power time intervals.

Similarly, the power receiver 105 comprises a second synchronizer 409 coupled to the power controller 401 and the second communication unit 405. The second synchronizer 409 is arranged to synchronize the short range (NFC) communication to the power transfer signal time frame such that the short range (NFC) communication is restricted to the reduced power time intervals.

Thus, the first and second communication units 305, 405 are controlled such that the communication over the NFC communication link is limited to the reduced power time intervals. Specifically, the transmission of a data message is performed only during a reduced power time interval and no transmissions of data occur outside of these (although in some embodiments the NFC transmitter of one of the first and second communication unit 305, 405 signal may e.g. continuously transmit an unmodulated carrier e.g. for powering a passive NFC communication unit).

For example, NFC communication may be performed in a passive mode wherein the target is a passive NFC communication entity that does not comprise functionality for powering itself. In the passive mode, the initiator generates an RF field and the target gets powered by this field. The target responds by modulating the existing RF field. As previously mentioned, the initiator can be implemented on the power transmitter side or on the power receiver side. However, if the target is placed on the power receiver side, the target could be directly powered from the initiator. This solution could prevent the implementation of an internal power supply (e.g. a battery) and the generation of carrier signal (i.e. a local oscillator) in the power receiver.

In some embodiments, the first synchronizer 309 and/or the second synchronizer 409 are arranged to synchronize the transmission of a data message to the reduced power time interval. Thus, the first synchronizer 309 may provide a timing signal to the first communication unit 305 which is used by the first communication unit 305 to time the transmission of a data message to the power receiver 105. Similarly, the second synchronizer 409 may provide a timing signal to the second communication unit 405 which is used by the first communication unit 405 to time the transmission of a data message to the power transmitter 101.

Similarly, in some embodiments, the first synchronizer 309 and/or the second synchronizer 409 are arranged to synchronize the reception of a data message to the reduced power time interval. Thus, the first synchronizer 309 may provide a timing signal to the first communication unit 305 which is used by the first communication unit 305 to time when the receiver of the first communication unit 305 can receive a data message from the power receiver 105. The first synchronizer 309 may accordingly ensure that only data messages transmitted in the correct time intervals can be received. This may be used to reduce power and/or to further reduce the risk of data messages being received from other sources than the intended power receiver 105. Similarly, the second synchronizer 409 may provide a timing signal to the second communication unit 405 which is used by this to time the reception of a data message from the power transmitter 101.

In most embodiments, the duration of the power time interval (or the combined duration of the power time intervals in case there is more than one) within each time frame is longer than the reduced power time interval (or the combined duration of the reduced power time intervals in case there is more than one) within each time frame. In many embodiments, it is at least 2, 3, 5 or even 10 times longer.

In embodiments, wherein each time frame comprises only one power time interval and one reduced power time interval, the duty cycle (for the reduced power time interval) is typically no more than 20%, 10% or even 5%.

This may typically be advantageous by providing sufficient time for establishing a communication channel of sufficient capacity without unacceptably impacting on the power transfer.

The time frame may typically have a duration of no less than 5 ms and no more than 200 ms. Furthermore, the time frame is a periodically repeating time frame. Accordingly, the repetition frequency is typically no less than 5 Hz and no more than 200 Hz. This may provide improved performance in many scenarios and may specifically allow the short range communication system to provide sufficiently fast communication with the maximum wait until data can be communicated being reduced to durations that will not result in unacceptable impact on the power transfer performance. Thus, it will tend to provide sufficiently fast response times for the power transfer to remain effective.

The time frame timing will typically be readily available in the power transmitter 101 as the same time base that is used to control (e.g. gate) the power transfer signal can be provided to the first synchronizer 309 (or can be generated by the first synchronizer 309 and fed to the power controller 303). At the power receiver 105, the timing can be derived from the power transfer signal itself by detection of the transitions between the power time intervals and the reduced power time interval based on the power level variations (e.g. using a Schmidt trigger circuit). For example, a first phase locked loop may be based on falling edge transitions (i.e. from power time interval to reduced power time interval) to generate a time base signal synchronized with the transitions from power time intervals to reduced power time intervals. A second phase locked loop may be based on rising edge transitions (i.e. from reduced power time intervals to power time intervals) to generate a time base signal synchronized with the transitions from reduced power time intervals to power time intervals. Then two generated signals may have a duty cycle of e.g. 50% and time base signal synchronized with both transitions can be generated by combining the two generated signals (using e.g. an OR or AND function).

FIG. 5 further illustrates an example of synchronized NFC communication. In the example, an initiator (which in different embodiments and scenarios may be either the power transmitter or the power receiver) transmits a data message in a first reduced power time interval. A target (which in different embodiments and scenarios may be either the power receiver or the power transmitter) receives the data message in the first reduced power time interval. In the subsequent reduced power time interval, the target responds by transmitting a response message to the initiator.

Thus, in the example, the communication units 305, 405 are arranged to reply to a data message where the reply is transmitted in a subsequent reduced power time interval to the one in which the data message is received.

Thus in the example, each reduced power time interval provides communication in one direction. Following a data message being transmitted in one direction, the receiving part transmits a response message in the following reduced power time interval.

Due to the data exchange activity operating time multiplexed with the power transfer, the available time for transmitting data messages is limited. This may reduce the amount of data which can be transmitted, and specifically the amount of data which can be transmitted within one reduced power time interval. The transmission in only one direction in each time interval may often provide a more efficient communication with lower overhead thereby allowing a higher overall data rate.

However, in some embodiments it may be desirable to have a faster response to data messages.

In some embodiments, the communication units 305, 405 may be arranged to reply to a data message in the same reduced power time interval in which the data message is received.

Figure 6:
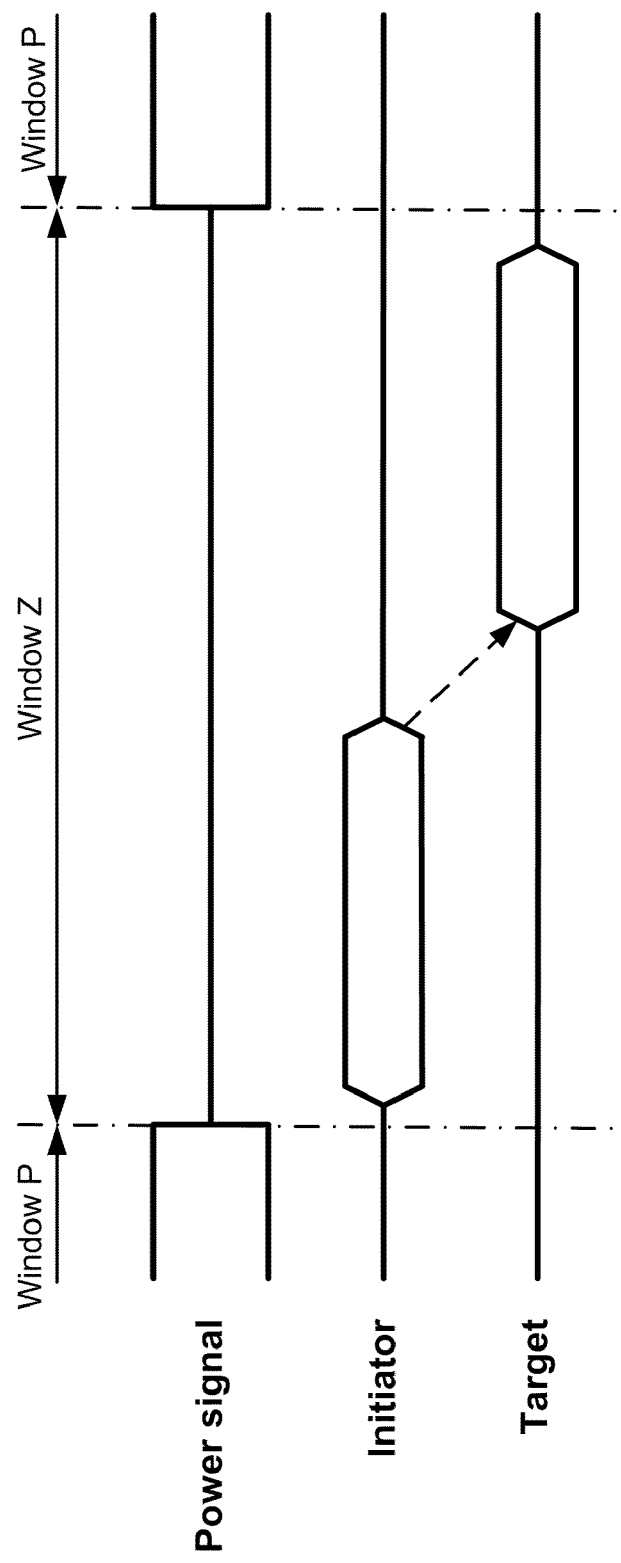
FIG. 6 illustrates an example of a possible timing diagram for signals of the power transfer system of FIG. 1.

An example of such a communication is illustrated in FIG. 6. In the example, the initiator sends its data during one reduced power time interval and the target sends its reply during the same reduced power time interval.

The transmission of response message in the same reduced power time interval may provide further advantages.

Before generating an operating field, the initiator should perform RF collision avoidance in accordance with the NFC standard (ref e.g. ISO/IEC 18092: Information technology—Telecommunications and information exchange between systems—Near Field Communication—Interface and Protocol (NFCIP-1), Second edition, 15 Mar. 2013). Specifically, an initiator shall not generate its own RF field as long as another RF field is detected. Such RF collision is intended to prevent NFC communications from interfering with each other.

When performing an RF collision in active communication mode (i.e. the target generates its own RF field), the system introduces a time interval from the time the RF field generated by the initiator is switched off until the time the RF field generated by the target is switched on. During this time interval, the initiator and the target do not generate any RF field. The duration of this time interval is known as the active delay time $T_{ADT}$ and is given as:

$$768/f_c(\approx 56.6 \text{ }\mu s) \leq T_{ADT} \leq 2559/f_c(\approx 188.7 \text{ }\mu s)$$

where $f_c$ is the carrier frequency (i.e. 13.56 MHz). After the active delay time, there is a guard time $T_{ARFG}$ which is the time between switching on the RF field of the target and starting to send the response message. $T_{ARFG}$ must be larger or equal to 1024/fc ($\approx$75.5 µs). However, these timing requirements for RF collision avoidance may often not allow the response message to be in a subsequent reduced power time interval as the delays will exceed the NFC requirements. Therefore, it may in many embodiments be advantageous to have bidirectional transmissions in each reduced power time interval.

In the system of FIG. 1, the communication units 305, 405 are further arranged to perform a number of operations to support the communication links.

Such operations may include detecting the communication capability of the other communication entity. For example, the initiator may determine the communication capability of the target, and may specifically determine e.g. whether the target is an active or passive target, which NFC mode it supports etc.

Another operation that may be performed to support the communication link(s) is collision detection which may specifically be performed to detect any simultaneous short range communications being performed, such as e.g. described in the NFC standard for collision resolution.

Another operation that may be performed to support the communication link(s) is a communication session initialization which may initialize the communication between the power transmitter 101 and the power receiver 105 (and between the initiator and the target). Specifically, the communication may be set up by following a specified procedure involving determination and adaptation of communication capabilities, exchanging identities, etc.

The operation may specifically be a device activation wherein an initiator may for example activate a target in preparation for the communication.

Specifically, for NFC the operations may include technology detection, collision resolution and device activation activities (described in e.g. NFC Activity Specification, Technical Specification, Version 1.0, NFC Forum, 18 Nov. 2010).

In many embodiments, these functions may be performed prior to the power transfer phase, i.e. they are performed before the power transmitter starts transmitting power to the (load of the) power receiver.

The activities are relatively time consuming activities and in many embodiments their timing requirements may not be compatible with the described data exchange scheme. Thus, if these activities where performed during power transfer, correct execution may not be guaranteed for some scenarios of some embodiments.

The approach may further include various approaches aimed at reducing the risk of the communication not being between the intended power transmitter 101 and the intended power receiver 105.

In many embodiments, the short range communication unit 305, 405 of the power receiver 105 and/or the power transmitter 101 may be to perform a detection of possible communication candidates for the short range communication. This may for example be performed during the collision resolution activity of an NFC communication. For example, the communication unit of the initiator may generate an RF signal and then monitor to see how many potential targets provide a response.

If more than one potential communication candidate is detected (i.e. more than one target for the NFC example), the communication unit indicates this to the power controller 303 (either directly or e.g. via load modulation if the detection is in the power receiver 105). The power controller 303 then proceeds to inhibit the power transfer, e.g. either by terminating a power transfer, by not initializing an intended power transfer, by restricting the maximum power limit etc.

As a specific example for NFC, if, during the collision resolution activity, more than one target is detected by the initiator, the power transmitter 101 will not generate a power transfer signal. Thus the power transmitter 101 does not transmit power as long as more than one target is detected. This may reduce the risk that a power transmitter or power receiver could communicate with more than one power receiver or power transmitter, respectively.

This can accordingly prevent various undesired scenarios.

Figure 7:
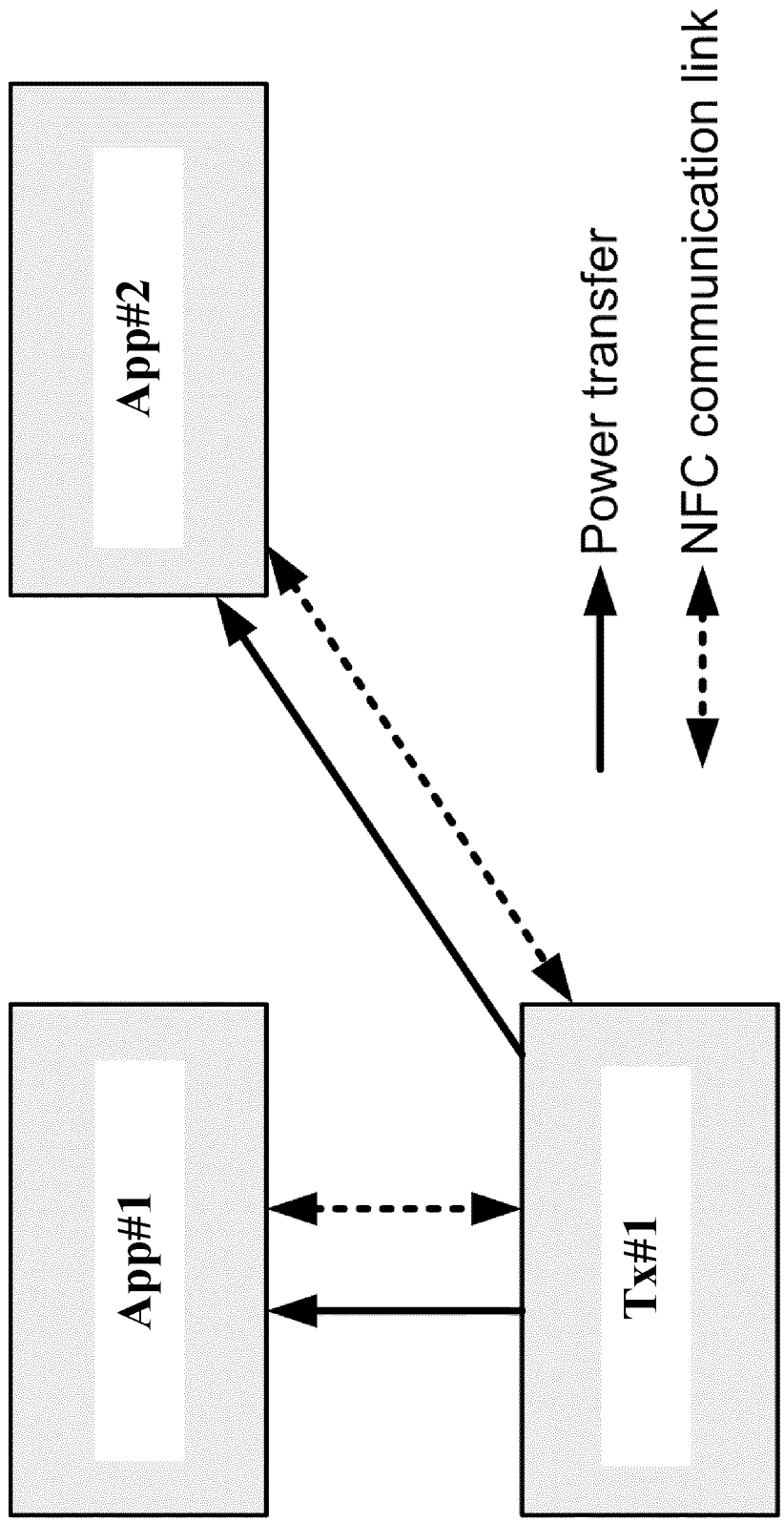
FIG. 7 illustrates an example of a possible scenario in a power transfer system.

For example, as illustrated in FIG. 7, if a second power receiver (App #2) is placed in close proximity to the intended power receiver (App #1), which receives power from a power transmitter (Tx #1), in such a way that it is in the communication range of the NFC device implemented in Tx #1, then App #2 could also communicate and receive power from the power transmitter. App #2, which is not supposed to receive power, could therefore unintentionally heat up resulting in an undesirable situation.

In a scenario where two power receivers (e.g. two appliances) can communicate with the same power transmitter, the two appliances could transmit contradicting commands to the power transmitter. For example, one could ask for more power, while the second appliance needs less power.

If NFC-F signal technology is employed in passive communication mode, the SENSF_REQ Command described in NFC Digital Protocol, Technical Specification, Version 1.0, NFC Forum, 17 Nov. 2010 can be used by the initiator to probe the operating field for targets. For each valid SENS-F_RES Response, the initiator increments its device counter (ref e.g. NFC Activity Specification, Technical Specification, Version 1.0, NFC Forum, 18 Nov. 2010.) This task is performed by the collision resolution activity. The number of targets that has been counted is the number of target devices configured with the NFC-F signal technology within the communication range of the initiator. Thus, if this number is larger than one, the power transmitter may inhibit the power transfer signal.

In some embodiments, the power receiver 105 may be arranged to disconnect the power receive coil 107 signal from the load 403 in response to there being no short range communication link established by the second communication unit 405. In such embodiments, the power receive coil 107 may be disconnected unless the second communication unit 405 has established a short range communication link with a power transmitter 101. Specifically, for NFC, the receive coil 107 is disconnected unless the power receiver 105 is an activated NFC device. In many embodiments, the receive coil 107 may also be disconnected from internal circuitry of the power receiver 105.

The approach may reduce the impact of the power receiver 105 unintentionally receiving a power transfer signal which is intended for providing power to another proximal power receiver.

As a specific example, in a scenario where NFC-A signal technology is employed in passive communication mode, the SDD_REQ Command described in NFC Digital Protocol, Technical Specification, Version 1.0, NFC Forum, 17 Nov. 2010 can be used by the initiator to detect whether more than one device of the same technology (NFC-A in this case) is in the operating field of the initiator. This can be detected during the collision resolution activity. Thus, if in the example described in FIG. 7, Tx #1 and App #1 communicate using NFC-A and App #2 is only able to communicate using NFC-F, the initiator will not detect that more than one device is in its communication range. In this case, App #2 would also receive power from Tx #1.

In order to prevent such a situation, the power coils of a power receiver may in some embodiments be disconnected from at least the load, and typically from other parts of the power receiver, if device activation (for the NFC communication link) has not been performed. In other words, the power coil of the power receiver 105 may in some embodiments be disconnected from the load unless the NFC communication unit is activated.

The above examples describe the power receiver 105 to be arranged to disconnect the power receive coil 107 signal from the load. However in some embodiments the power receiver 105 cannot disconnect the power receive coil 107 signal from the load.

In such scenarios, the power receiver 105 may be arranged to reduce the power to the load 403 in response to there being no short range communication link established by the second communication unit 405. In such embodiments, the power receive coil 107 may be short-cut or the resonance circuit attached to the receiver coil 107 may be detuned unless the second communication unit 405 has established a short range communication link with a power transmitter 101.

In some embodiments, the power receiver 105 may comprise a user interface and may generate a user alert in response to a detection of a presence of a power transfer signal and of there being no short range communication link established by the communication unit.

For example, if the power receiver 105 includes an inductive heating element (i.e. a smart pan) instead of power receiver coil, it is not possible to disconnect the receive coil 107 from other circuitry, and unintentional heating of the inductive heating element could occur if the power receiver is positioned to receive a power transfer signal intended for another power receiver. In this case, the appliance may warn the user of this undesirable situation with for example an audible noise and/or a warning light. A user can then manually address the situation.

In some embodiments, the power controller 303 is arranged to inhibit power transfer in response to a detection that a response message expected from the second entity is not received within a given time interval. The message may e.g. be a dedicated response message expected in response to a message transmitted from the power transmitter 101 or may e.g. be a message that the power receiver 105 is expected to transmit as part of the normal operation. E.g. during power transfer operation, the power receiver 105 should transmit power control messages at least every 250 msec or faster. If such messages are not received in time, the power controller 303 may proceed to inhibit power transfer, and specifically it may terminate the power transfer or reduce the power level of the power transfer signal (particularly to zero).

The approach may for example detect if the power receiver 105 has been removed during power transfer. The operation may depend on which entity is the initiator. If the initiator is implemented on the power transmitter side, the initiator will not receive a response from the target during the reduced power time interval if the power receiver has been removed. The first communication unit 305 may accordingly generate a timeout error and in response the power controller 303 can terminate power transfer.

In some embodiments, the power controller 303 may arranged to inhibit power transfer in response to a detection of an absence of a radio signal from the power receiver 105.

For example, if the initiator is placed on the power receiver side, a target is implemented on the power transmitter side. If the communication is based on the active communication mode, the target will not sense the RF field generated by the initiator when it is in listen mode. If the communication is passive communication mode, the target will not be powered by the initiator anymore. Thus, whether in active or passive communication mode, the absence of the RF signal from the initiator (the power receiver 105) can be detected, and the detection of the absence of this signal can be fed to the power controller 303 which accordingly can proceed to inhibit the power transfer, typically by terminating the power transfer.

In some embodiments, the second communication unit 405 is arranged to prevent a termination of the communication link with the power transmitter 101 in response to a detection of the power transfer signal being present. Specifically, the second communication unit 405 will not terminate the communication link as long as a power transfer signal is present (in the power time intervals). Thus, the short range communication link is supported by the second communication unit 405 as long as there is a power transfer signal from the power transmitter 101 during the power time intervals. This may reduce the risk of the power transmitter 101 accidentally being controlled by an unintended power receiver 105.

Specifically, for NFC communication, device deactivation activity is not performed as long as the power transmitter transmits a power transfer signal. This may prevent that a second appliance (e.g. App #2 in FIG. 7) which is within the communication range of the power transmitter (Tx#1 of FIG. 7) from being able to communicate with the power transmitter (Tx#1 of FIG. 7) while this is transmitting power and exchanging data with a first appliance (App#1 of FIG. 7). As NFC communication only supports communication between two entities, the maintenance of one communication link can prevent another one from being setup (specifically if the communication between the two entities is in the data exchange phase).

In some embodiments, the power transmitter 101 and/or the power receiver 105 may also be arranged to transmit identification data and to monitor for whether expected identification is received.

Specifically, the initiator may at regular intervals request an identification number of the target it is communicating with. In response, the initiator will receive the identification number and check whether this matches the expected value. If not, the power transfer may be inhibited, and typically may be terminated.

Specifically, if the power transmitter 101 does not receive a correct identification from the power receiver 105 (e.g. as part of the other data messages being received from the power receiver 105), the power controller 303 is informed and it accordingly proceeds to terminate the power transfer.

In such examples, the power receiver 105 may thus repeatedly transmit an identification of itself to the second power transmitter 101. The transmissions may be upon request from the power transmitter 101 or may be independently generated, such as e.g. by including an identification in all messages, or by transmitting the documentation at regular intervals.

Thus, the system may include additional precautionary measures that may e.g. help reduce the risk of a power transmitter communicating with more than one power receiver, a power transmitter providing power to a power receiver it is not in communication with, a power transmitter communicating with a power receiver with which a communication link was not initialized, and/or a power receiver communicating with more than one power transmitter.

As previously mentioned, the forward and/or reverse communication links are communication links that do not utilize the transmit coil 103, the receive coil 107 or indeed the power transfer signal. Rather, they are in the system of FIG. 1 independent communication links that are not affected by variations in the characteristics of the power transfer, and specifically are not affected by the variations of the load of the power transfer signal. Accordingly, the approach allows significantly improved communication with substantially reduced sensitivity to e.g. dynamic load variations.

Also, the application of specifically NFC communication allows existing communication systems which include transmitter and receiver chips, antennas, communication protocol, etc., that are already available on the market to be used. No dedicated communication methods need to be developed. Thus, a significant gain in development time could be gained as well as reduced cost due to economies of scale.

Furthermore, a substantially increased data rate can be achieved with specifically NFC supporting a maximum data rate of up to 424 kbit/s. This communication speed is much larger than the 2 kbit/s achieved by the QI wireless power specification for low power even if the discontinuous communication is factored in.

Furthermore, using NFC which has a maximum communication range up to about 4-10 cm, it can be ensured that the power transmitter 101 receives control data from a power receiver 105 which is very close thereby reducing or potentially eliminating the risk of a power transfer being controlled by a different power receiver than the one involved in the power transfer. The NFC chip and antenna may be placed in the power transmitter in such a way that it can only communicate with a power receiver that is positioned substantially on or near the transmit coil and not with a power receiver positioned on another transmit coil or power transmitter. Thus, a communication link would only be established between a power transmitter and a power receiver to which it is providing power. Communicating with a power receiver placed on top of a different power transmitter would be prevented since the power receiver would be outside the communication range of the power transmitter.

In some embodiments, the power transmitter may be arranged to generate the power transfer signal from a varying DC power transfer signal.

Figure 8:
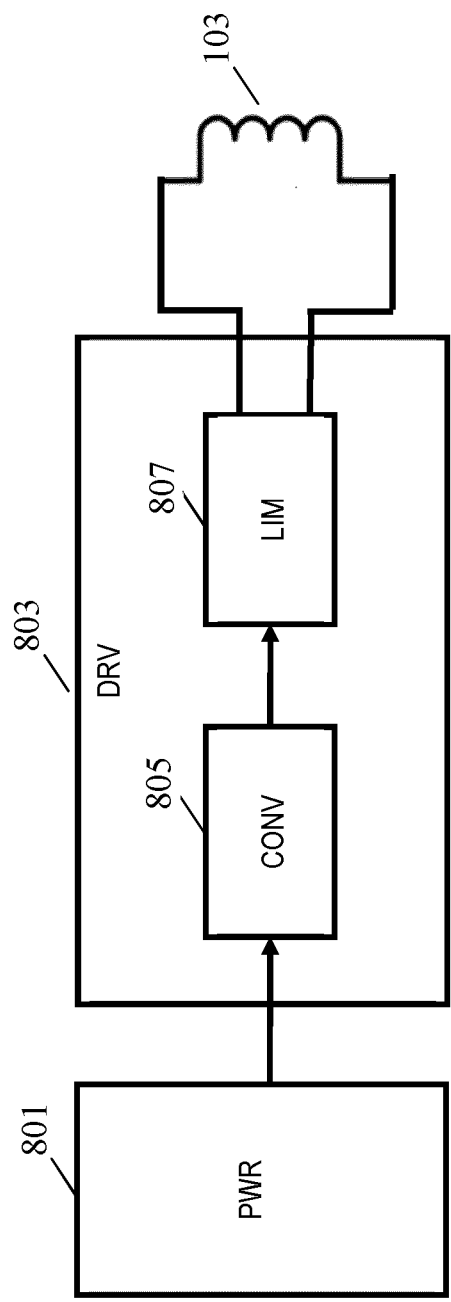
FIG. 8 illustrates an example of elements of a driver for the power transmitter of FIG. 3.
Figure 9:
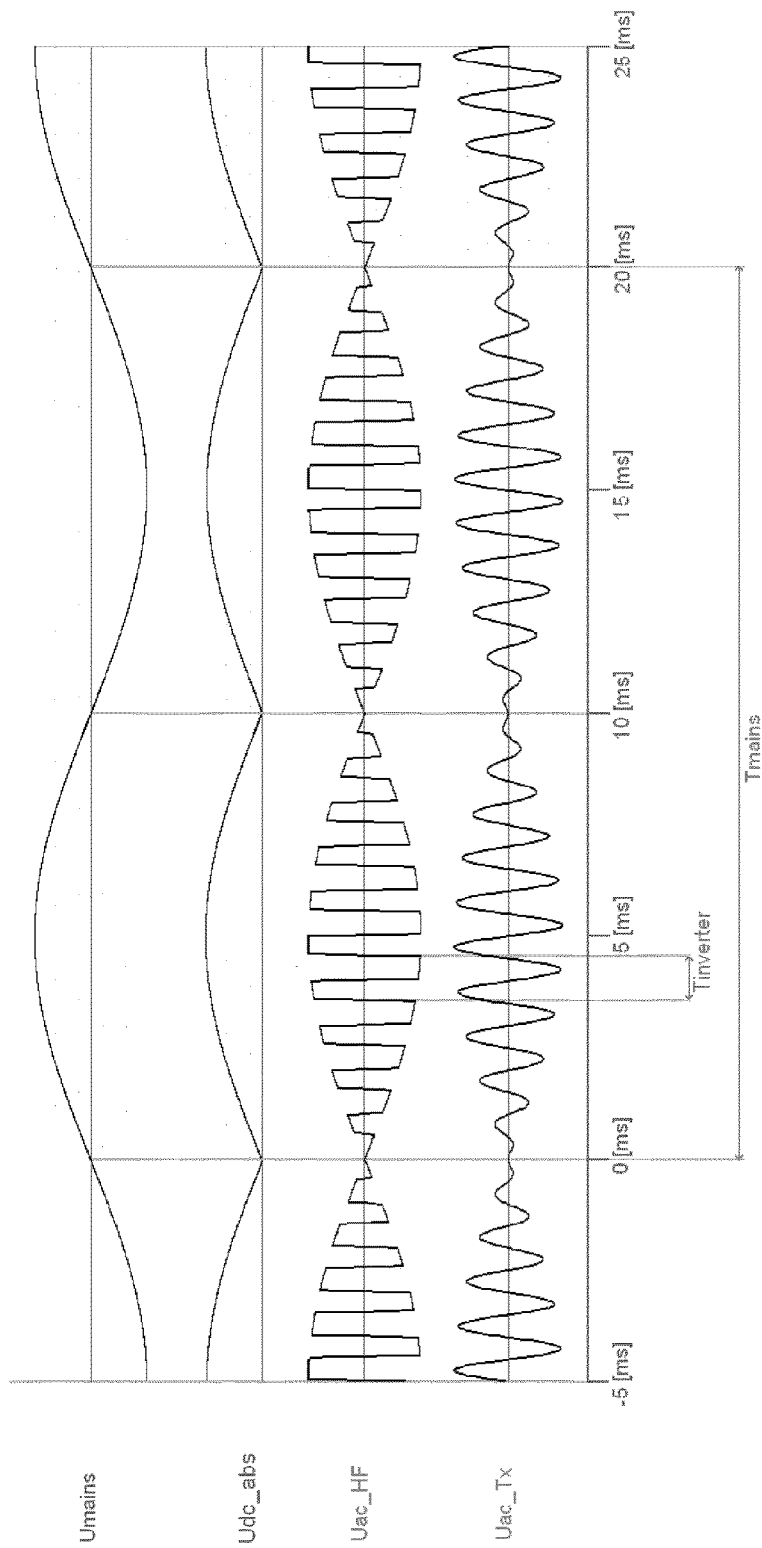
FIG. 9 illustrates an example of signals in a power transmitter.

An example of such a driver is illustrated in FIG. 8. FIG. 9 illustrates examples of signal waveforms for signals of the driver 201.

The driver 201 comprises a power source 801 which generates a power source signal. The power source 801 is a periodically varying signal which has a frequency of the periodic variations of no more than 1 kHz, and typically no more than 500 Hz or 200 Hz. In many embodiments, the periodic variations corresponds to the variations of an input AC signal, and specifically to periodic variations resulting from an input mains signal having a frequency of between 40 Hz and 70 Hz (typically 50 Hz or 60 Hz). The periodic variations may specifically result from a rectification of an input AC signal, and may accordingly typically have a frequency corresponding to the frequency of the input AC signal (single rectification) or twice the frequency of the input AC signal (double rectification).

The power source signal is accordingly a periodically varying signal which may have a periodically varying power/voltage/current. The variations have a low frequency of no more than 1 kHz and typically the power source signal is a low frequency signal with a frequency corresponding to that of the input AC signal (or twice that).

Specifically in the example an AC to DC converter which receives an AC signal and generates a DC signal with a varying level. In the specific example, the power source 801 receives a mains derived sine wave signal with a frequency of 50 Hz or 60 Hz (Umains of FIG. 9). The power source 801 performs a full wave rectification of the sine wave signal. Thus a power source signal corresponding to the Udc_abs signal of FIG. 9 is generated.

In the specific example, the power source 801 does not include any smoothing capacitor and thus the power source signal corresponds to a full wave rectified sine wave signal. However, in other embodiments, the power source 801 may comprise a capacitor which smoothes the rectified signal thereby generating a power source signal with less level variation. However, in most embodiments the capacitor may be relatively small resulting in a power source signal with a level that varies substantially, at least for some loads. E.g. in many scenarios, the ripple may be at least 25% or 50% of the full load.

Thus, a DC power source signal is generated which has a varying voltage. The varying voltage is due to the variations of the AC level and thus the DC power source signal is a periodic signal with a period of twice the frequency of the mains, i.e. with a period of 10 msec for a 50 Hz input signal.

The power source 801 is coupled to a power transfer signal generator 803 which receives the power source signal and which from this generates a drive signal for the inductor 103 which is coupled to the power transfer signal generator 803.

The power transfer signal generator 803 specifically comprises a frequency converter 805 which is arranged to generate the frequency of the drive signal to be higher than the frequency of the power transfer signal. The frequency converter may increase a frequency of the drive signal relative to the power transfer signal. The inductor 103 is driven by a drive signal which has a substantially higher frequency than the frequency of the power source signal. The period of the power source signal is typically no less than 2.5 msec or even 5 msec (corresponding to a frequency of 400 Hz or 200 Hz respectively). However, the drive signal typically has a frequency of at least 20 kHz to 200 kHz. During power transfer intervals, the drive signal may specifically be given as:

$$d(t)=p(t)\cdot x(t)$$

where p(t) is the power source signal and x(t) is a signal with a higher frequency than p(t), and typically with a much higher frequency (e.g. typically 100 times higher or more). In order to reduce losses, x(t) is typically an AC signal, i.e. it has an average value of zero.

x(t) may for example be a sine wave. However, in the example of FIG. 8, x(t) corresponds to a square wave signal. The frequency conversion is in the example performed by a switching operation rather than by a multiplication. Specifically, the frequency converter 805 comprises a switch circuit to which the power source signal is provided as a supply voltage and which couples to the inductor 103 via switch elements that provides an effect corresponding to the multiplication of the power source signal and a frequency conversion signal x(t).

Figure 10:
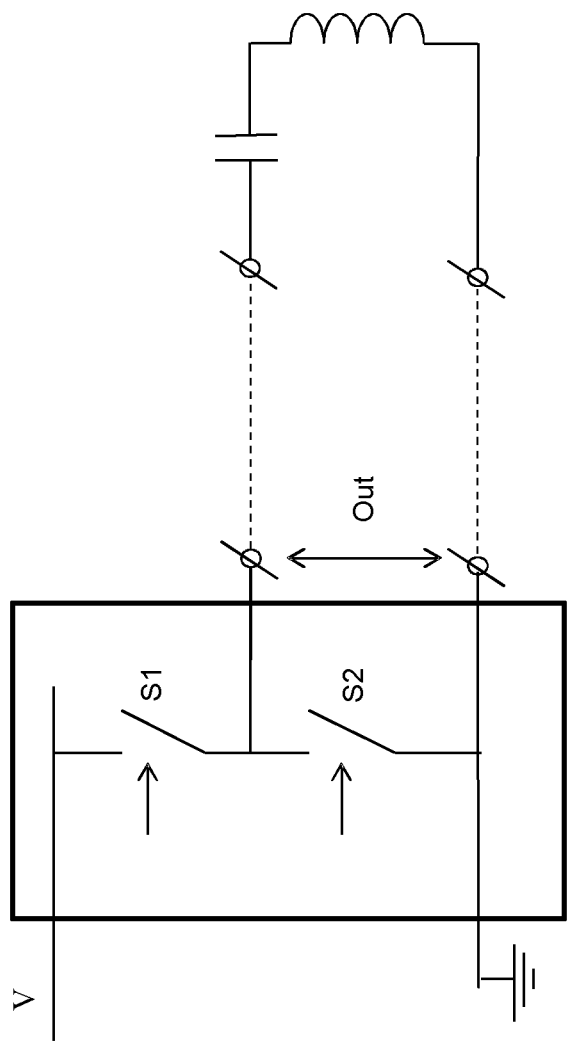
FIGS. 10 and 11 illustrate examples of a drive circuit for a transmit coil of a power transmitter.
Figure 11:
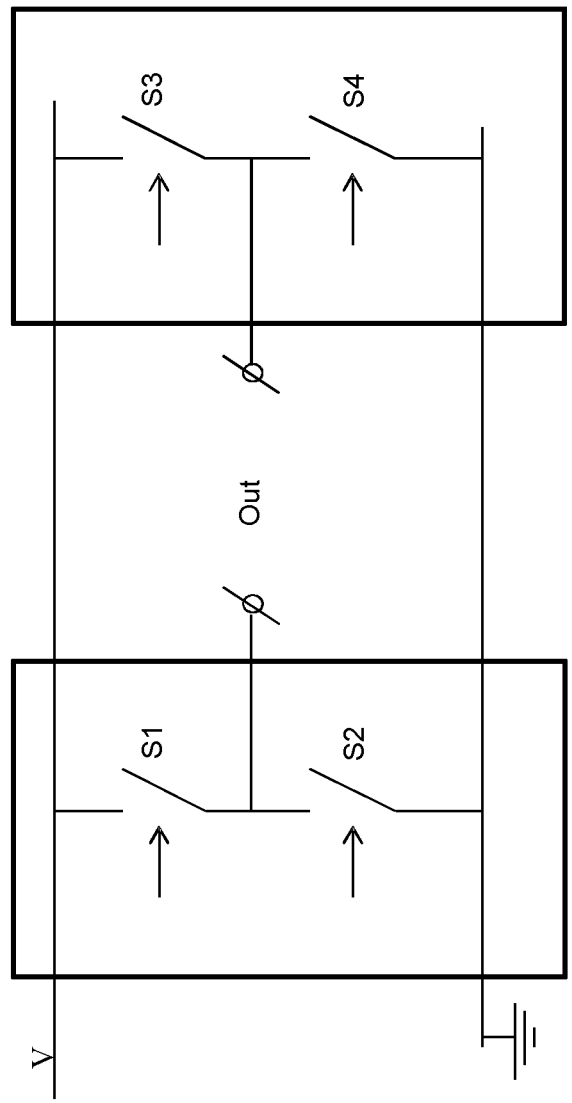

In the system of FIG. 8, the frequency converter 805 includes a drive circuit in the form of an inverter which generates an alternating signal from the varying DC Voltage of the power source signal being used as a supply voltage. FIG. 10 shows an example of a half-bridge inverter. The switches S1 and S2 are controlled such that they are never closed at the same time. Alternatingly S1 is closed while S2 is open, and S2 is closed while S1 is open. The switches are opened and closed with the desired frequency, thereby generating an alternating signal at the output. FIG. 11 shows a full-bridge inverter. The switches S1 and S2 are controlled such that they are never closed at the same time. Similarly, the switches S3 and S4 are controlled such that they are never closed at the same time. Alternatingly switches S1 and S4 are closed while S2 and S3 are open, and then S2 and S3 are closed while S1 and S4 are open, thereby creating a square wave signal at the output. The switches are opened and closed with the desired frequency.

The resulting signal Uac_HF is illustrated in FIG. 9. The application of this signal to the transmit coil 103 which typically includes a resonance signal would result in the signal Uac_TX of FIG. 9.

However, in the driver 201 of FIG. 8, the signal generated by the frequency converter 805 is not directly fed to the transmitter coil 103. Rather, the signal is fed to a limiter 807 which is arranged to restrict the power of the drive signal that is fed to the inductor such that this power is below a given threshold during the reduced power time intervals, i.e. during the communication intervals. The output of the limiter 807 is fed to the transmitter coil 103. Typically this coupling includes a resonant circuit (which may be considered part of the limiter 807).

As a specific example, the limiter 807 may simply restrict the power of the signal being fed to the transmitter coil 103 by disconnecting the transmitter coil 103 from the output of the frequency converter 805. Thus, in the example, the signal from the frequency converter 805 is coupled to the transmitter coil 103 during power transfer intervals which are interrupted by communication intervals in which the signal from the frequency converter 805 is not coupled to the transmitter coil 103.

The limiter 807 may also be an intrinsic part of the inverter. As a specific example, the switches in a full bridge inverter, which are normally switched with a phase difference, meaning that at least part of the time the switches S1 and S4 are closed while S2 and S3 are open and vice versa, generation of the square wave can be stopped by the switching without phase difference meaning that switches S1 and S3 are closed while S2 and S4 are open and vice versa. In general, the strength of power transfer signal can be controlled by the phase in the full bridge. The more the switches are in phase the lower the amplitude of the power transfer signal, the more the switches are out-of phase, the higher the amplitude of the power transfer signal.

Figure 12:
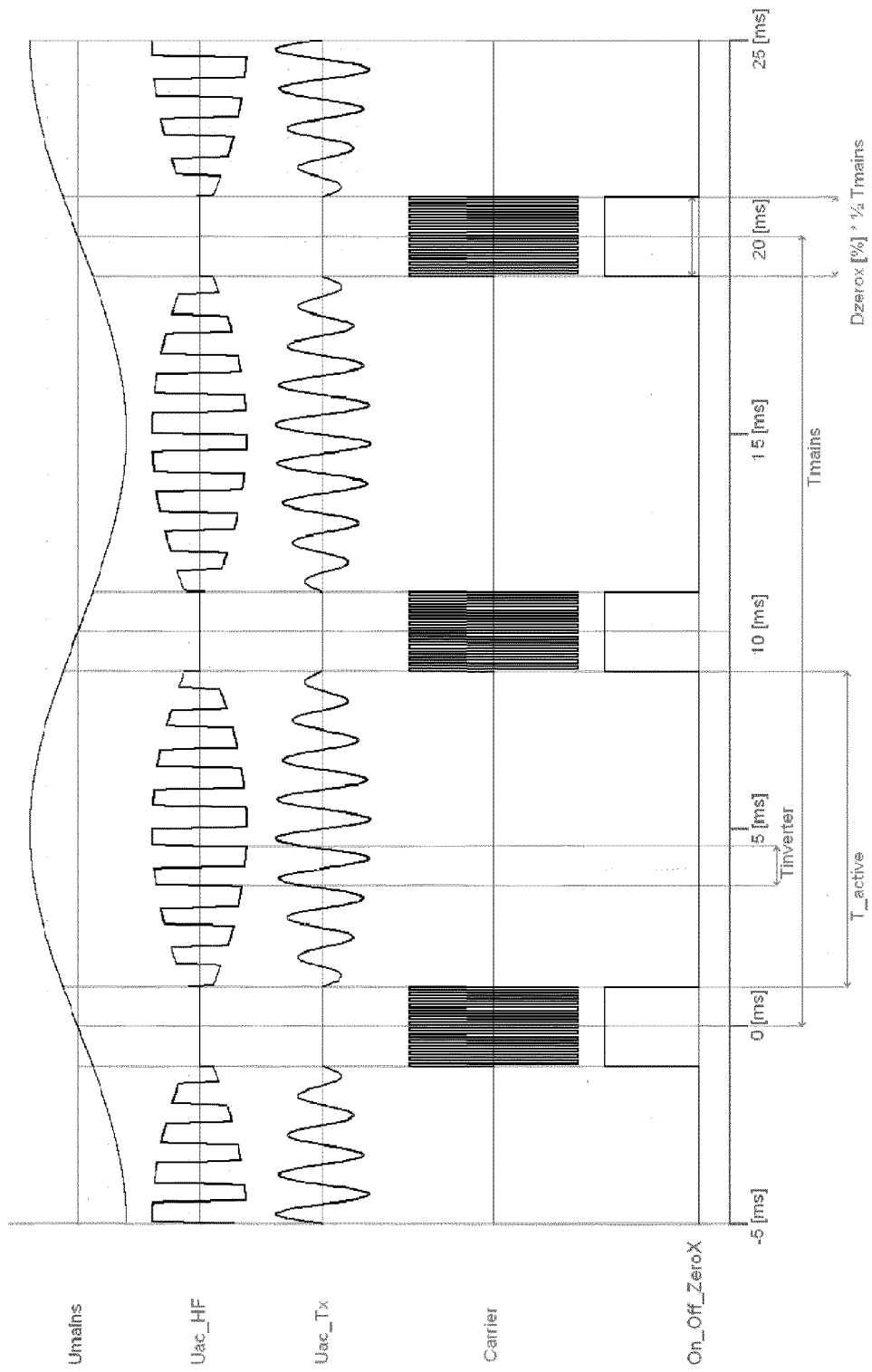
FIG. 12 illustrates an example of signals in the power transmitter of FIG. 3.

FIG. 12 illustrates the resulting signals (using the same notation as for FIG. 9). The figure first shows the signal Umains which is the mains signal fed to the power source. This signal is full wave rectified to generate a signal level varying power source signal corresponding to Udc_abs as shown in FIG. 9. The frequency converter 805 then converts this to a high frequency signal corresponding to Uac_HF of FIGS. 9 and 12. However, rather than just feeding this signal to the transmitter coil 103/resonant circuit, the signal is gated (i.e. connected and disconnected) in accordance with the gate signal On_Off_ZeroX signal of FIG. 12. When this gate signal has a low value, the power transfer signal generated by the frequency converter 805 is coupled to the transmitter coil 103/resonant circuit and when this gate signal has a low value, the power transfer signal generated by the frequency converter 805 is not coupled to the transmitter coil 103/resonant circuit. Thus the resulting signal after gating is shown as Uac_HF of FIG. 12 which after smoothing by the resonant circuit becomes signal Uac_Tx of FIG. 12. Thus, the power transfer signal fed to the transmitter coil 103 corresponds to the signal Uac_Tx of FIG. 12 in this specific example.

As an example, the limiter 807 may be incorporated with the half or full bridge inverter. When the gate signal On_Off_ZeroX signal has a low value, all the switches of the half or full bridge inverter can be switched into the non-conducting state, making the power transfer signal not coupled to the transmitter coil.

The gating signal thus defines power transfer intervals in which the power transfer drive signal is fed to the transmitter coil 103. These power transfer intervals are interrupted by reduced power time intervals in which the power transfer signal is not fed to the transmitter coil 103. In the driver of FIG. 8, these repeating time intervals/reduced power time intervals are instead used for short range communication between the power transmitter 101 and the power receiver 105, i.e. they are used as communication intervals (indicated by the NFC Carrier signal of FIG. 12).

Thus, the reduced power time intervals are in this case not generated randomly or independently of the power transfer signal but are synchronised to the variations in the power transfer signal. Specifically, the reduced power time intervals correspond to time intervals for which a value/level of the power source signal is below a threshold.

Thus, a power source synchronizer may synchronize the reduced power time intervals to periodic variations in the power source signal, and specifically this may be achieved by the gating signal switching between the high and low values at appropriate times.

The power source synchronizer may specifically synchronize the reduced power time intervals to correspond to periodic minima of the absolute value of the power source signal. For a varying DC signal, this may correspond to the periodic minima of the value of the power source signal. For an AC signal, this may correspond to the periodic minima of the value of the power source signal as it would be after being rectified. Indeed, for an AC signal, this may correspond to the zero crossings of the value of the power source signal. The power source synchronizer may specifically measure the voltage of the power source signal and synchronize to this voltage. However, equivalently, the power source synchronizer may measure the current or power of the power source signal and synchronize to this current or power. Indeed, a synchronization based on measurement of one of these values will also result in a synchronization based on the other values. Thus, it will be appreciated that any suitable parameter may be used to perform the synchronization.

The power source synchronizer may in many embodiments perform a synchronization such that a frequency of reduced power time intervals is no more than five times higher or lower than the frequency of the periodic variations. In many embodiments, the power source synchronizer may in many embodiments perform a synchronization such that a frequency of the reduced power time intervals is the same as or twice the frequency of the periodic variations. Indeed, in many embodiments, a reduced power time interval is generated for each minima of an absolute of the power source signal.

Indeed, in the example of FIG. 12, one reduced time interval is generated for each zero crossing of the AC input signal, corresponding to each minima of the rectified input signal.

Essentially, the reduced power time intervals are selected to correspond to the zero crossings of the power source signal Umains and thus to the parts of the signal where the power transfer is the least efficient. This approach may result in a more efficient power transfer.

As illustrated by the signal (NFC) carrier in FIG. 12, the NFC communication is synchronized to the reduced power time intervals and thus to the zero crossings of the power source signal.

In the following some specific comments related to NFC implementations will be provided.

In some embodiments, the NFC communication may be in accordance with the NFC-A/NFC-DEP Protocol.

In this case, in the Poll Mode (i.e. from initiator to target), the transmitted signal is a 13.56 MHz carrier signal modulated using a Modified Miller coding with ASK 100% modulation. In Listen Mode (i.e. from target to initiator), the target responds by modulating the carrier signal using a Manchester coding with OOK subcarrier modulation. The bit duration for NFC-A is equal to approximately 9.44 μs. Thus, a data rate of 106 kbit/s is achievable.

In the example, a typical duration for a reduced power time interval may be around 2 ms. During a reduced power time interval, the initiator transmits data packets according to the bit level coding, the frame format, the data format and the payload format defined as defined in NFC Digital Protocol, Technical Specification, Version 1.0, NFC Forum, 17 Nov. 2010.

Figure 13:
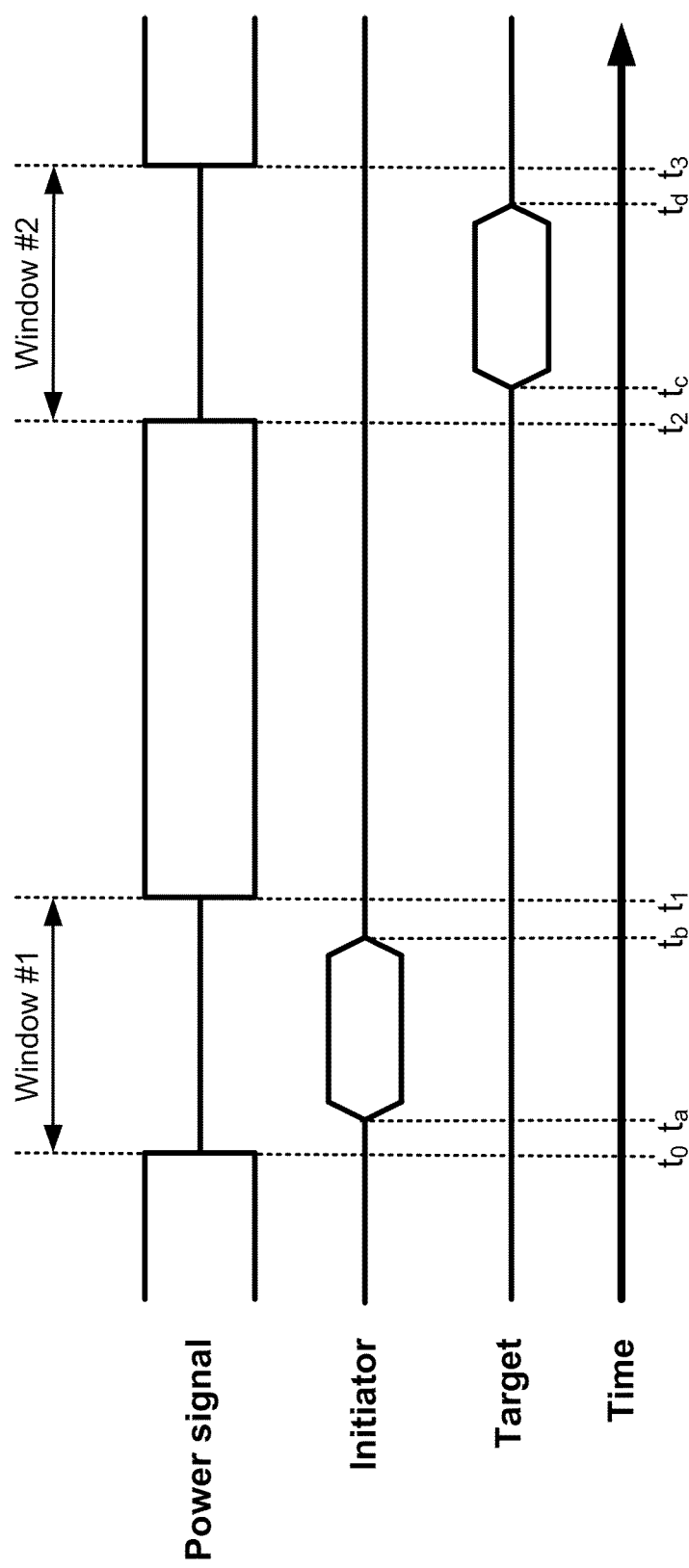
FIG. 13 illustrates an example of a possible timing diagram for signals of the power transfer system of FIG. 1.

A timing diagram of the operation is illustrated in FIG. 13. In the example:

The first bit of the transmitted frame is selected to occur at the start of reduced power time interval/time window. A small time delay ($t_a$-$t_0$) is introduced between the start of the time window and the transition of the first bit.

The last bit of the transmitted frame (i.e. last bit of the End of Frame) is selected to occur before the end of the reduced power time interval/time window.

Thus, the communication units are triggered by the synchronizers at the start of a reduced power time interval/time window.

As depicted in FIG. 13, the Frame Delay Time Poll→Listen ($FDT_{Poll\_Listen}$) is equal to $t_c$-$t_b$. In this figure, the initiator is sending data during one reduced power time interval window and the target is responding during the next reduced power time interval. $FDT_{Poll\_Listen}$ may be designed to meet the following timing requirements:

$FDT_{Poll\_Listen}$ should be larger than the minimum Frame Delay Time defined in the NFC standard. The minimum Frame Delay Time is in all cases smaller than the time period $t_2$-$t_1$. Thus, the requirement is inherently met.

$FDT_{Poll\_Listen}$ should be smaller than the Response Waiting Time (RWT) defined in the NFC standard. The Response Waiting Time defines the time within which the target has to send the Start of Data (SoD) of its response after the end of a poll frame. It is calculated by the formula:

$$RWT=(256 \times 16/f_c) \times 2^{WT}$$

where $f_c$ is the carrier frequency (i.e. 13.56 MHz) and WT is a value in the range of 0 to 14. The value WT is transmitted to the initiator during the target activation activity. In order to have safe operation, RWT is selected to be larger than the power time interval ($t_2$-$t_1$). This value is typically around 8 ms. Thus, the value WT must be equal to or larger than 5, which corresponds to a RWT approximately equal to 9.67 ms. For safe operation, a value equal or larger than 6 may be used.

As illustrated in FIG. 13, if the initiator is sending data during one reduced power time interval and the target is responding during the next reduced power time interval, $FDT_{Poll\_Listen}$ should be larger than the time window during which power is transferred ($t_2$-$t_1$) and smaller than the time window $t_3$-$t_1$.

If the target is responding during the same reduced power time interval as used by the initiator to transmit its data, $FDT_{Poll\_Listen}$ should be small enough (typically in the order of 100 μs) in order to have $t_d$-$t_a$<$t_1$-$t_0$.

The Frame Delay Time Listen→Poll ($FDT_{A,POLL}$) is the time between a Listen and a Poll Frame. A maximum value $FDT_{A,POLL,MAX}$ is not defined. Thus, after the target has responded, the initiator is free to choose which reduced power time interval it is using to send the following data packets.

In some embodiments, the NFC communication may be in accordance with the NFC-F/NFC-DEP Protocol.

In this example, in both transmission directions (i.e. Poll Mode and Listen Mode), the transmitted signal is a 13.56 MHz carrier signal modulated using a Manchester coding with ASK modulation. One advantage of NFC-F over NFC-A is that larger data rates are achievable. A data rate of 212 kbit/s or 424 kbit/s is achievable.

The same timing requirements as illustrated for the NFC-A/NFC-DEP Protocol may also be applicable in such embodiments.

In some embodiments, the NFC communication may be in accordance with the NFC-A/Type 4A Tag/ISO-DEP Protocol The same timing requirements as illustrated for the NFC-A/NFC-DEP Protocol may also be applicable in such embodiments.

In some embodiments, the NFC communication may be in accordance with the NFC-F/Type 3 Tag/Half-duplex Protocol.

The Type 3 Tag platform uses NFC-F Frame Delay Times. It uses the Maximum Response Time (MRT), as defined by the NFC standard for the timing requirements. In order to have safe operation, MRT is selected to be larger than the power time interval ($t_2-t_1$). MRT is calculated by the formula:

$$MRT = T \times ((A+1) + n(B+1)) \times 4^E$$

where:
The parameter n denotes the size for the Block field (i.e. the number of blocks) in the CHECK or UPDATE commands.
The value T is equal to 302.1 μs ($256 \times 16/f_c$).
The parameter A, B, and E are transmitted to the initiator when it probes the Operating Field. As shown in FIG. 13, these parameters must be chosen in order to be larger than the Frame Delay Time Poll→Listen ($t_c-t_b$).

In the following some comments relating to the possible physical positioning will be provided with specific reference to NFC embodiments.

The physical arrangement may seek to prevent that an NFC communication unit (initiator or target) implemented in a power transmitter is able to communicate with a NFC communication unit implemented in another power transmitter. Thus, in order to obtain the smallest possible distance between two power transmitters, the coil of the NFC communication units (i.e. their antennas) may be:
placed in the same plane as the power coils.
aligned with the center of the power coils.

Figure 14:
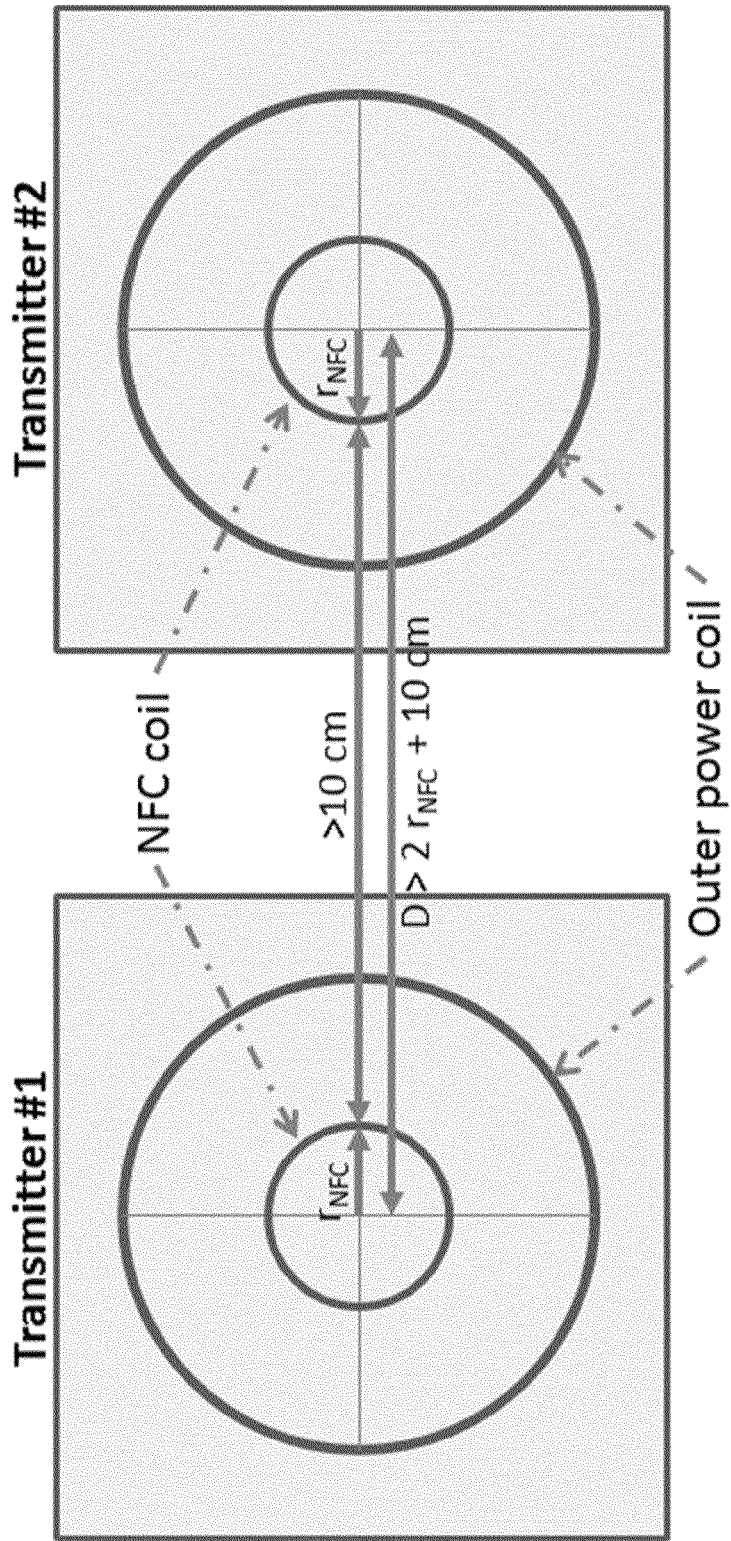
FIGS. 14 and 15 illustrate examples of arrangements of power coils in the transfer system of FIG. 1.

This configuration is depicted in FIG. 14. As shown, the distance between two NFC coils may be selected to be larger than 10 cm, which is approximately the maximum communication range achievable. Thus, the center-to-center distance D between two power transmitters may be selected to be larger than $d_{NFC}+10$ cm, where $d_{NFC}$ is the diameter of a NFC coil. In the annex of the NFC Analog Specification, a reference design is provided. The NFC coils have an outer diameter of 7 cm. Thus, D may be selected to be larger than 17 cm. If NFC coils are used which are larger than the coils provided in the reference design, the distance may be increased.

A similar coil topology (i.e. NFC coils aligned with the center of the power coils) may also be employed for the NFC coils implemented in the power receiver. In that case, a communication link between a power transmitter and a power receiver can only occur if these two entities are aligned for power transfer, although a small misalignment (with depends on counter top thickness and on the communication range) is still permitted. If the wireless powered appliance includes an inductive heating (i.e. a smart pan) instead of power receiver coil, the NFC may be selected to be aligned with the center of the inductive heating system.

Figure 15:
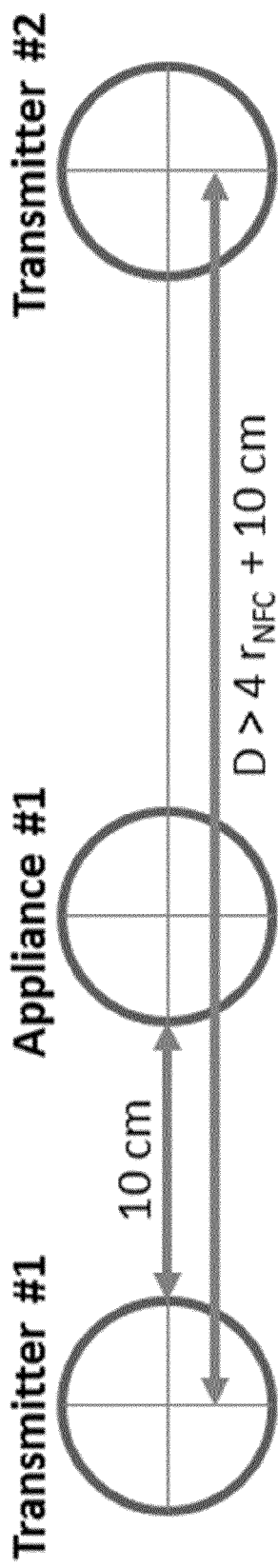

Since a power receiver could have its NFC coil 10 cm away from the NFC coil of its power transmitter and still be able to communicate, a second power transmitter should be placed at a distance D larger than $2*d_{NFC}+10$ cm in order to prevent a communication link between the power receiver and the second power transmitter; $d_{NFC}$ being the diameter of a NFC coil. This configuration is shown in FIG. 15. As a worst case, a counter top thickness equal to zero is considered. With the dimensions of the reference design provided in the NFC Analog Specification, D should be larger than 24 cm.

If a second wireless powered appliance is placed on the counter top surface, its NFC coil should be placed more than 10 cm away from the center of the NFC coil of the transmitter in order to have no communication link between the power transmitter and this second appliance.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for a wireless power transfer system, comprising:
   a transmitting unit configured to transfer power to a receiving unit wirelessly and inductively via a power signal during a periodically repeating time frame, the time frame comprising 1) a power time interval during which the power signal is transmitted, and 2) a reduced power time interval during which the power signal is reduced but not terminated;
   a power transfer inductor for transferring the power signal;
   a communication antenna for a short range communication;
   a short range communication unit coupled to the communication antenna and configured to communicate a data message between the transmitting unit and the receiving unit using the short range communication, the short range communication using a carrier signal separate from the power signal; and
   a synchronizer configured to synchronize the short range communication to the time frame such that the short range communication is restricted to the reduced power time interval.

2. The apparatus of claim 1, wherein a frequency of the carrier signal is at least twice a frequency of the power signal.

3. The apparatus of claim 1, wherein the power signal during the reduced power time interval is approximately no more than 20% of the power signal during the power time interval.

4. The apparatus of claim 1, wherein the short-range communication is a Near Field Communication, and the short range communication unit is configured to operate as an initiator for initiating a short range communication link.

5. The apparatus of claim 1, wherein the short range communication unit is configured to reply to the data message during the reduced power time interval in which the data message is received.

6. The apparatus of claim 1, wherein the short range communication unit is configured to reply to the data message during a reduced power time interval subsequent to the reduced power time interval in which the data message is received.

7. The apparatus of claim 1, wherein the short range communication unit is configured to perform at least a first operation prior to entering a power transfer phase, the at least first operation comprising an operation selected from:
   a detection of a communication capability;
   a communication collision detection;
   a communication session initialization; and
   a device activation.

8. The apparatus of claim 1, wherein the short range communication unit is configured to repeatedly transmit an identification.

9. The apparatus of claim 1, further comprising a power transfer controller configured to inhibit a transfer of the power in response to failing to receive an indication of an identity matching an expected identification value.

10. The apparatus of claim 1, wherein the apparatus is a power transmitter.

11. The apparatus of claim 10, further comprising
   a power source for providing a periodically varying power source signal, wherein a frequency of periodic variations in the power source signal is approximately no more than 1 kHz;
   a power transfer signal generator for generating a drive signal for a power transmit inductor from the power source signal, the power transfer signal generator comprising:
      a frequency converter configured to generate a frequency of the drive signal to be higher than the frequency of periodic variations in the power source signal, and
      a limiter for restricting the power of the drive signal supplied to the power transmit inductor to be below a threshold in the reduced power time interval; and
   a power source synchronizer for synchronizing the reduced power time intervals to periodic variations in the power source signal.

12. The apparatus of claim 11, wherein the power source synchronizer is configured to synchronize the reduced power time interval to correspond to periodic minima of an absolute of the power source signal.

13. The apparatus of claim 10, wherein the short range communication unit is configured to perform a detection of communication entities that can be communicated by the short range communication, and the apparatus further comprises a power transfer controller configured to inhibit a transfer of the power if more than one communication entity is detected.

14. The apparatus of claim 10, further comprising a power transfer controller configured to inhibit a transfer of the power in response to a detection that a response message is not received within a predetermined time interval.

15. The apparatus of claim 10, further comprising a power transfer controller configured to inhibit a transfer of the power in response to a detection of an absence of a radio signal.

16. The apparatus of claim 1, wherein the apparatus is a power receiver.

17. The apparatus of claim 16, further comprising a controller configured to reduce the power to a load of the power receiver in response to a detection of an absence of a communication signal.

18. The apparatus of claim 16, further comprising a user interface configured to generate a user alert in response to detecting an absence of a communication signal.

19. The apparatus of claim 16, wherein the short range communication unit is configured to inhibit a communication link termination in response to a detection of the power signal being present.

20. The apparatus of claim 16, wherein the synchronizer is configured to determine a timing of the time frame in response to periodic power variations of the power signal.

21. A method of operation in a wireless power transfer system, comprising:
   transferring power, by a power transmitter, to a power receiver wirelessly and inductively via a power signal during a periodically repeating time frame, the time frame comprising 1) a power time interval during which the power signal is transmitted, and 2) a reduced power time interval during which the power signal is reduced but not terminated;
   communicating a data message between the power transmitter and the power receiver using a short range communication based on a carrier signal separate from the power signal;

using a communication antenna different from a power transfer inductor for transferring the power signal; and
synchronizing the short range communication to the time frame such that the short range communication is restricted to the reduced power time interval.

* * * * *